US009879404B2

(12) United States Patent
Schroeder et al.

(10) Patent No.: US 9,879,404 B2
(45) Date of Patent: Jan. 30, 2018

(54) HYDRAULIC SYSTEM FOR ENERGY REGENERATION IN A WORK MACHINE SUCH AS A WHEEL LOADER

(75) Inventors: Kyle William Schroeder, Saint Paul, MN (US); Wade Leo Gehlhoff, Shakopee, MN (US)

(73) Assignee: Eaton Corporation, Cleveland, OH (US)

( * ) Notice: Subject to any disclaimer, the term of this patent is extended or adjusted under 35 U.S.C. 154(b) by 1168 days.

(21) Appl. No.: 13/324,620

(22) Filed: Dec. 13, 2011

(65) Prior Publication Data

US 2012/0180470 A1 Jul. 19, 2012

Related U.S. Application Data

(60) Provisional application No. 61/422,338, filed on Dec. 13, 2010, provisional application No. 61/422,346,
(Continued)

(51) Int. Cl.
*F16D 31/02* (2006.01)
*E02F 9/22* (2006.01)
(Continued)

(52) U.S. Cl.
CPC .......... *E02F 9/2217* (2013.01); *E02F 9/2296* (2013.01); *F15B 1/024* (2013.01);
(Continued)

(58) Field of Classification Search
CPC ...... F15B 1/024; F15B 11/006; F15B 11/024; F15B 21/14; E02F 9/2217
(Continued)

(56) References Cited

U.S. PATENT DOCUMENTS 6,655,136 B2 12/2003 Holt et al.
7,444,809 B2 * 11/2008 Smith et al. .................... 60/414
(Continued)

FOREIGN PATENT DOCUMENTS

DE 10 2007 054 035 A1 6/2008
JP 2008-121893 5/2008

OTHER PUBLICATIONS

International Search Report and Written Opinion mailed Jun. 14, 2012.

(Continued)

*Primary Examiner* — Michael Leslie
(74) *Attorney, Agent, or Firm* — Merchant & Gould P.C.

(57) ABSTRACT

A hydraulic system is adapted to recover potential and kinetic energy of a work attachment of a work machine. A valve arrangement may configure the hydraulic system in various modes. The hydraulic system may provide suspension and/or actuation for the work attachment. The energy of the work attachment may move a rod of a first cylinder. The rod may pressurize fluid within the first cylinder. The pressurized fluid may flow from the first cylinder through a valve and into an accumulator. The first cylinder may amplify pressure of the fluid. The pressurized fluid in the accumulator may actuate the first cylinder. The movement of the rod of the first cylinder may cause simultaneous actuation of a second cylinder. A controller may monitor pressures and positions of components of the hydraulic system and control the valve arrangement.

46 Claims, 16 Drawing Sheets

Related U.S. Application Data filed on Dec. 13, 2010, provisional application No. 61/553,704, filed on Oct. 31, 2011, provisional application No. 61/554,772, filed on Nov. 2, 2011.

(51) Int. Cl.

| | |
|---|---|
| ***F15B 1/02*** | (2006.01) |
| ***F15B 11/00*** | (2006.01) |
| ***F15B 11/024*** | (2006.01) |
| ***F15B 21/14*** | (2006.01) |

(52) U.S. Cl.

CPC .......... *F15B 11/006* (2013.01); *F15B 11/024* (2013.01); *F15B 21/14* (2013.01)

(58) Field of Classification Search

USPC ............. 60/414, 424; 91/436, 437, 515, 520

See application file for complete search history.

(56) References Cited

U.S. PATENT DOCUMENTS

| | | | |
|---|---|---|---|
| 2003/0213238 | A1 | 11/2003 | Smith |
| 2005/0246082 | A1 | 11/2005 | Miki et al. |
| 2007/0074509 | A1 | 4/2007 | Zhang et al. |
| 2007/0186548 | A1 | 8/2007 | Smith et al. |
| 2008/0110165 | A1 | 5/2008 | Hamkins et al. |
| 2008/0110166 | A1 | 5/2008 | Stephenson et al. |
| 2010/0024410 | A1 | 2/2010 | Brickner |

OTHER PUBLICATIONS

European Office Action for Application No. 11 799 939.1 mailed Apr. 25, 2014.

Invitation to Pay Additional Fees with Partial International Search mailed Mar. 22, 2012.

Japanese Office Action for Application No. 2013-544687 with Machine Translation and Partial Human Translation dated Aug. 1, 2016.

Japanese Office Action for Application No. 2013-544687 with Human Translation and Examined Claims. Office Action dated Aug. 1 (dated Aug. 3), 2016.

* cited by examiner

FIG. 13
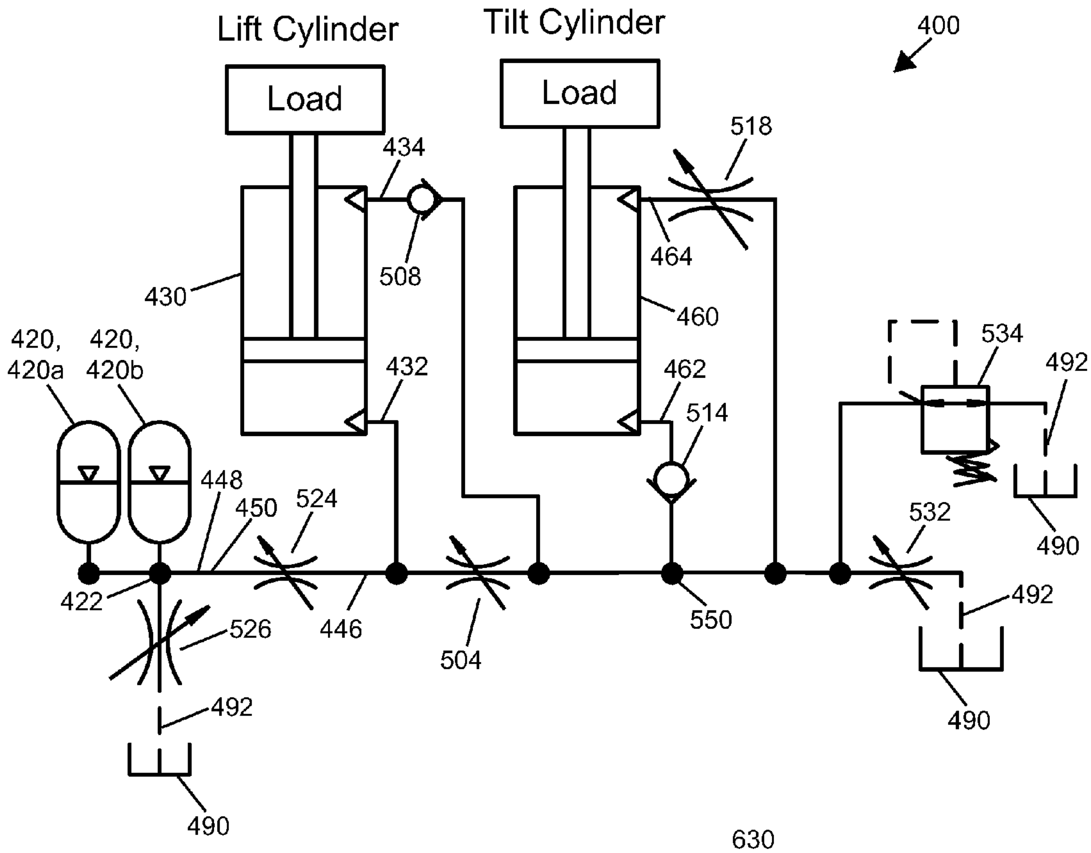
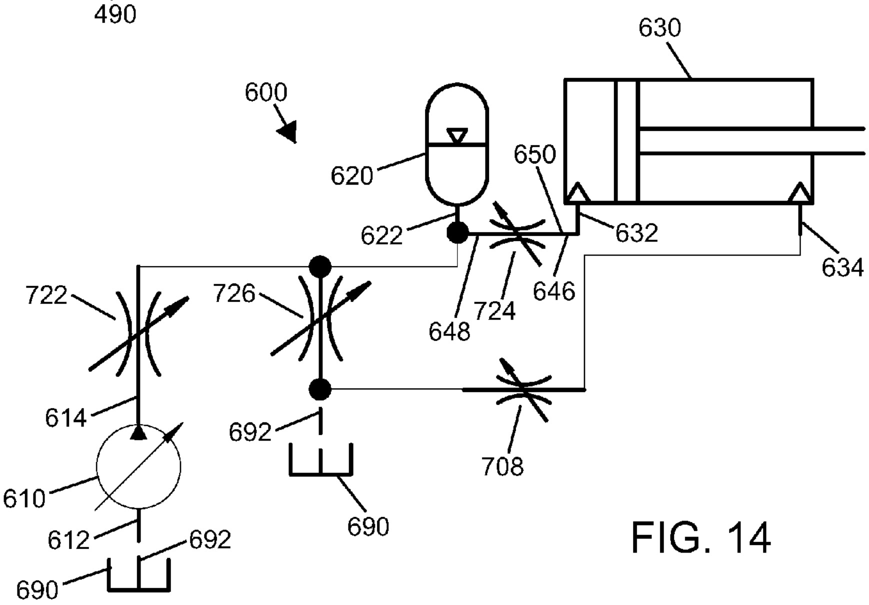
FIG. 14

FIG. 15
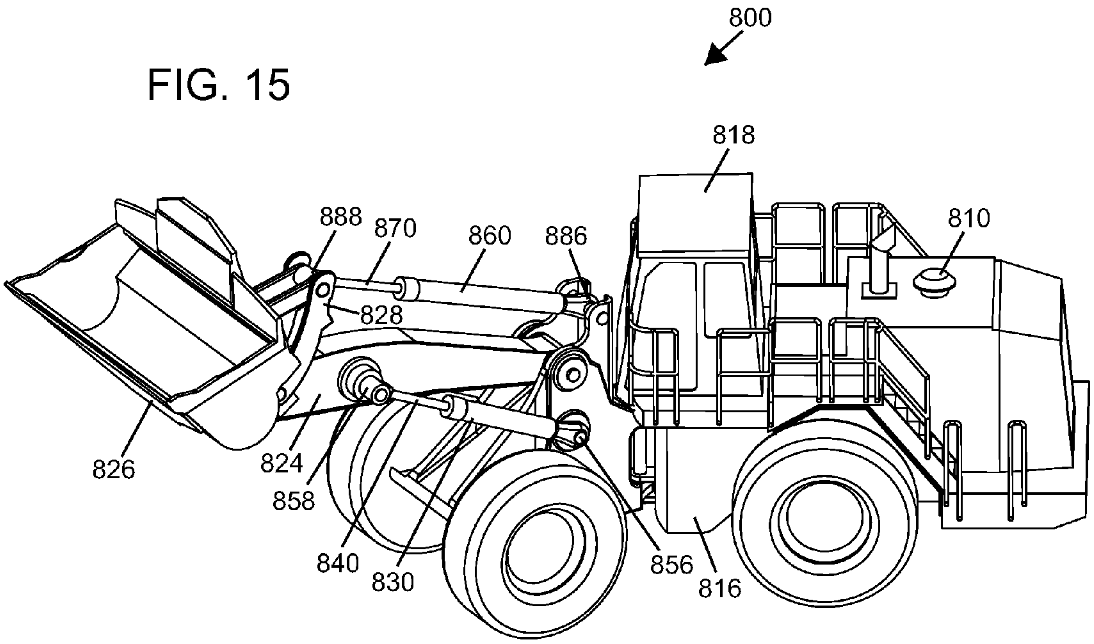
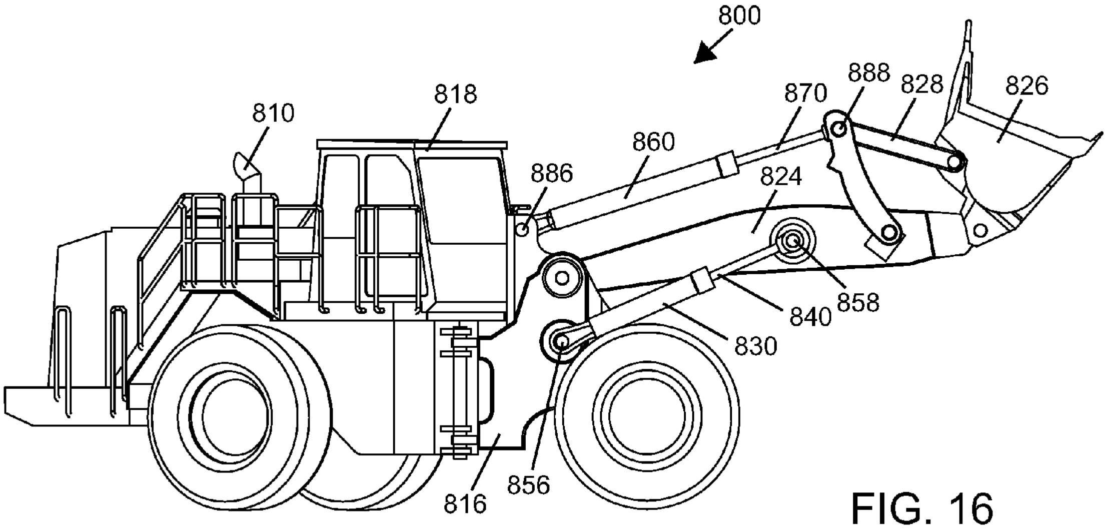
FIG. 16

HYDRAULIC SYSTEM FOR ENERGY REGENERATION IN A WORK MACHINE SUCH AS A WHEEL LOADER

CROSS-REFERENCE TO RELATED APPLICATIONS

The present application claims priority to U.S. Provisional Patent Application Ser. No. 61/422,338 entitled "Accumulator Based Regeneration for a Wheel Loader" and filed on Dec. 13, 2010; U.S. Provisional Patent Application Ser. No. 61/422,346 entitled "Regenerative Boom Lift System for a Wheel Loader" and filed on Dec. 13, 2010; U.S. Provisional Patent Application Ser. No. 61/553,704 entitled "Hydraulic System for Energy Regeneration in a Work Machine such as a Wheel Loader" and filed on Oct. 31, 2011; and U.S. Provisional Patent Application Ser. No. 61/554,772 entitled "Hydraulic System for Energy Regeneration in a Work Machine such as a Wheel Loader" and filed on Nov. 2, 2011. The above identified disclosures are hereby incorporated by reference in their entirety.

TECHNICAL FIELD

The present disclosure relates to systems and methods for capturing, storing, and regenerating energy that would otherwise be wasted. More particularly, the present disclosure is directed to a hydraulic system that uses an accumulator and fluid flow control devices to capture, store, and regenerate energy. In addition, the hydraulic system can provide suspension for a work attachment connected to a mobile work machine.

BACKGROUND

Work machines can be used to move material, such as ore, dirt, and/or debris. Examples of work machines include wheel loaders, track loaders, excavators, backhoes, bull dozers, telehandlers, etc. The work machines typically include a work implement connected to the work machine. The work implements attached to the work machines are typically powered by a hydraulic system. The hydraulic system can include a hydraulic pump that is powered by a prime mover, such as a diesel engine. The hydraulic pump can be connected to hydraulic actuators by a set of valves to control flow of pressurized hydraulic fluid to the hydraulic actuators. The pressurized hydraulic fluid causes the hydraulic actuators to extend, retract, or rotate and thereby cause the work implement to move.

The movement of the work implement may be used to raise the work implement and any material carried by the work implement against gravity. When the work implement is raised, potential energy is imparted to the work implement. When the work implement is lowered, the potential energy is typically lost to heat via the pressurized hydraulic fluid being throttled across a valve. When the work implement is moved, kinetic energy is imparted to the work implement. When the work implement is slowed or stopped, the kinetic energy is typically lost to heat via the pressurized hydraulic fluid being throttled across a valve.

The hydraulic system of the work machine may also be used to provide ride control (i.e., suspension) to the work implement. When the work machine is driven over uneven surfaces and/or obstacles, the work implement may place unwanted dynamic loads on the work machine. These unwanted dynamic loads may be reduced (i.e., softened) by a hydraulic accumulator that is fluidly connected to the hydraulic actuator.

SUMMARY

One aspect of the present disclosure relates to systems and methods for effectively recovering and utilizing energy that would otherwise be wasted in a work machine. The systems may be hydraulic systems, and the energy may be recovered from potential energy and kinetic energy of a work attachment of the work machine. The systems may further provide suspension for the work attachment.

Another aspect of the present disclosure relates to a hydraulic suspension system that provides suspension to a work implement connected to a mobile work machine. The hydraulic suspension system includes a first hydraulic cylinder, a hydraulic accumulator, and a first flow control valve. The first hydraulic cylinder includes a first port that is fluidly connected to a head chamber of the first hydraulic cylinder. The first hydraulic cylinder further includes a second port that is fluidly connected to a rod chamber of the first hydraulic cylinder. The first hydraulic cylinder further includes a piston that is positioned between the head chamber and the rod chamber and further includes a rod that extends between a first end and a second end and extends through the rod chamber. The first end of the rod is connected to the piston and the second end of the rod is connected to a load of the work implement. The hydraulic accumulator includes an inlet/outlet port. The first flow control valve includes a first port and a second port. The first port of the first flow control valve directly fluidly connects to the first port of the first hydraulic cylinder by a first fluid line, and the second port of the first flow control valve directly fluidly connects to the inlet/outlet port of the hydraulic accumulator by a second fluid line. The hydraulic suspension system is adapted to capture energy from the load of the work implement and store the energy in the hydraulic accumulator. The hydraulic suspension system is adapted to reuse the energy in lifting the work implement with the rod of the first hydraulic cylinder.

The hydraulic suspension system may further include a first flow control device, a second flow control device, a second flow control valve, a hydraulic junction, and a second hydraulic cylinder including a first port and a second port. The first flow control device is fluidly connected between the second port of the first hydraulic cylinder and the hydraulic junction. The second flow control device is fluidly connected between the first port of the second hydraulic cylinder and the hydraulic junction. The second flow control valve is fluidly connected between the first port of the first hydraulic cylinder and the hydraulic junction. And, the hydraulic suspension system is adapted to transform the energy from the load of the work implement into actuation energy of the second hydraulic cylinder.

In certain embodiments, the first hydraulic cylinder is a boom cylinder of the work implement, and the second hydraulic cylinder is a bucket cylinder of the work implement. Transforming the energy from the load of the work implement into the actuation energy may results in simultaneous movement of the boom cylinder and the bucket cylinder.

In certain embodiments, the first flow control device and the second flow control device are each check valves.

In certain embodiments, a fluid displacement rate of the head chamber is between about 1.1 and 3 times larger than a fluid displacement rate of the rod chamber when the piston is moved. In certain embodiments, the hydraulic suspension system is adapted to fluidly connect the first and the second ports of the first hydraulic cylinder and thereby amplify a hydraulic pressure generated by the first hydraulic cylinder under the load of the work implement. The hydraulic suspension system is adapted to charge the hydraulic accumulator with the amplified hydraulic pressure.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 13 is a schematic diagram of a hydraulic system that is a first subset of the hydraulic system of FIG. 1;

FIG. 14 is a schematic diagram of a hydraulic system that is a second subset of the hydraulic system of FIG. 1;

FIG. 15 is a perspective view of a work machine in which the hydraulic systems of FIGS. 1, 13, and/or 14 may be used;

FIG. 16 is a side view of the work machine of FIG. 15;

DETAILED DESCRIPTION

Reference will now be made in detail to example embodiments of the present disclosure. The accompanying drawings illustrate examples of the present disclosure. When possible, the same reference numbers will be used throughout the drawings to refer to the same or like parts.

Figure 1:
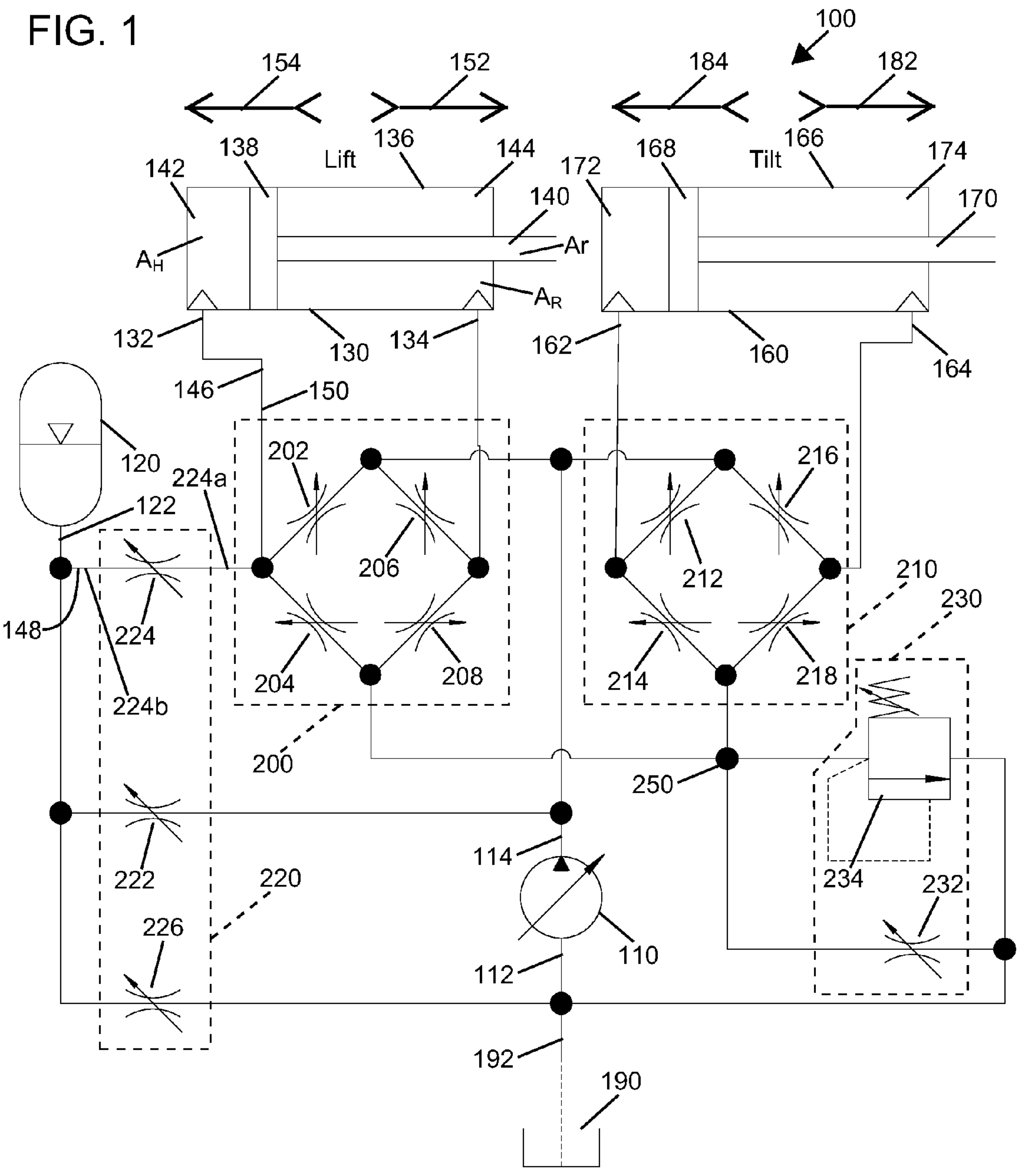
FIG. 1 is a schematic diagram of a hydraulic system according to the principles of the present disclosure.
Figure 17:
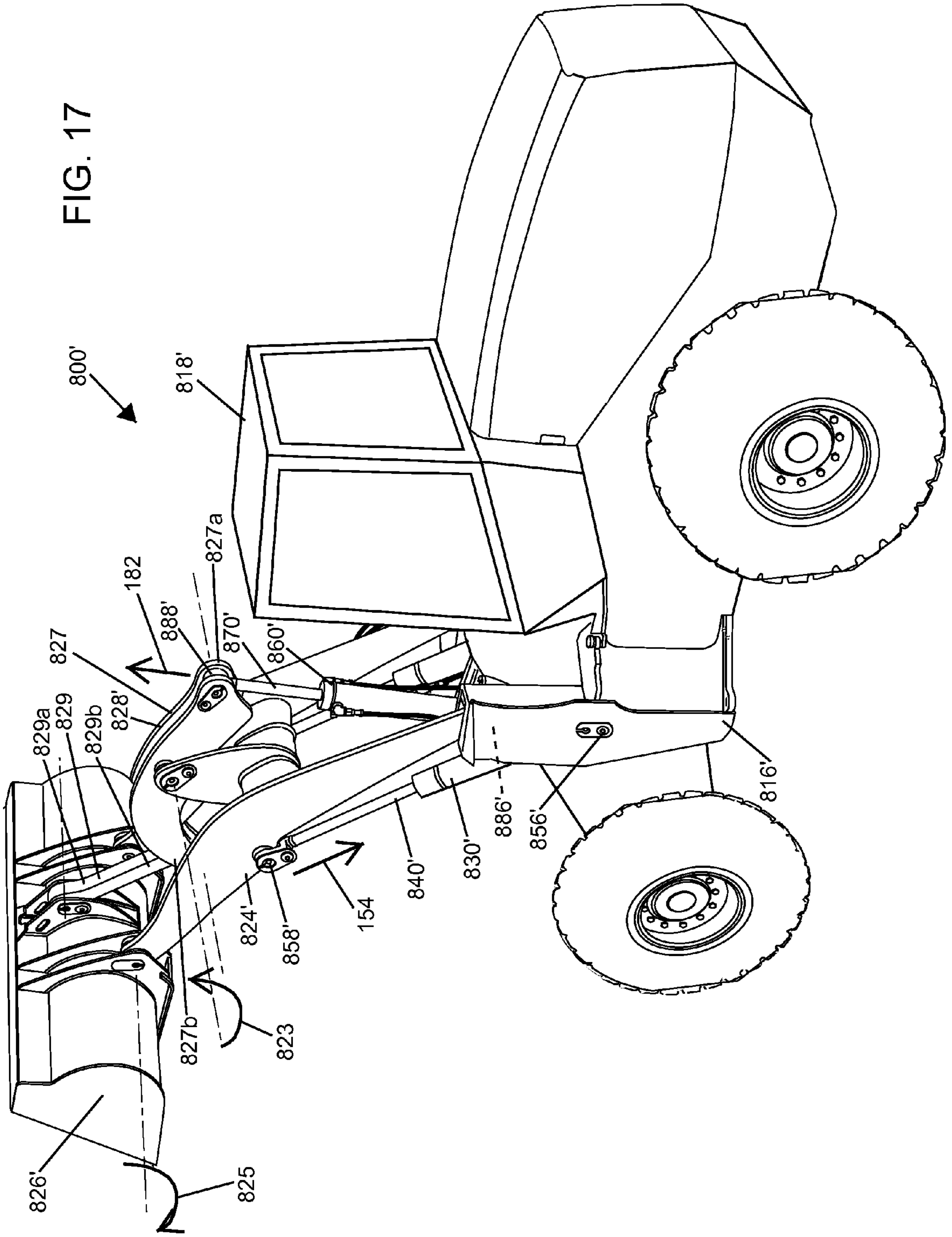
FIG. 17 is a perspective view of another work machine in which the hydraulic systems of FIGS. 1, 13, and/or 14 may be used.

FIG. 1 schematically illustrates a hydraulic system 100. The hydraulic system 100 is provided for use on a work machine. Example work machines may be any machine that includes a hydraulically powered work implement. FIGS. 15 and 16 illustrate an example wheel loader 800 as the work machine. FIG. 17 illustrates an example wheel loader 800' as the work machine. Other work machines may be, for example, an excavator, a bull dozer, a track loader, a back hoe, a telehandler, etc. As will be described in detail below, the hydraulic system 100 is adapted to function as a suspension system (e.g., a boom suspension system) for the work implement. As will also be described in detail below, the hydraulic system 100 is adapted to recover, store, and regenerate energy (e.g., kinetic and potential energy from and to the work implement).

The hydraulically powered work implement may be any type of implement commonly connected to the work machine. FIGS. 15 and 16 illustrate a bucket 826 as the hydraulically powered work implement. FIG. 17 illustrates a bucket 826' as the hydraulically powered work implement. Other examples of the hydraulically powered work implement may include a blade, a fork, a shovel, a basket, etc. When used in accordance with the principles of the present disclosure, the hydraulic system 100 may capture energy that would otherwise be wasted, may store the captured energy, and may regenerate energy from the stored energy for further use. By capturing, storing, and/or regenerating energy, the hydraulic system 100 may increase an overall efficiency of the work machine. In addition, the hydraulic system 100 may lower operating costs of the work machine, may reduce emissions emitted by the work machine, may reduce a cooling load required by the work machine, may allow a smaller prime mover to be used in the work machine, may decrease a work cycle time of the work machine, may increase a working speed of the work machine, and/or may reduce environmental impact of the work machine.

The hydraulic system 100 may capture and/or convert energy from potential energy of the work implement (e.g., from the work implement's weight and elevation acted on by gravity) and/or may capture and/or convert energy from kinetic energy of the work implement (e.g., from the work implement's movement relative to the work machine). The hydraulic system 100 may store the captured energy in a hydraulic accumulator and/or may directly convert the captured energy to other movement of the work implement (e.g., convert boom movement to bucket movement). The hydraulic system 100 may further dynamically exchange and/or dissipate energy as a suspension system of the work machine. For example, the hydraulic system 100 may provide a spring-like characteristic between the work implement and the work machine, may provide a damping characteristic between the work implement and the work machine, may provide a shock absorbing characteristic between the work implement and the work machine, etc.

In certain embodiments, components used in the hydraulic system 100 (e.g., a hydraulic accumulator 120) may be the same as or substantially the same as corresponding components of a hydraulic suspension system used in a work machine with a work implement suspension system but with no energy recovery system. Certain of such work machines may be retrofitted with the hydraulic system 100 to add energy recycling capability and/or other benefits, as mentioned in the preceding paragraph. As the components typically used in the hydraulic suspension system are further used in capturing energy, incremental cost of adding the energy recycling capability is low.

Energy storage capacity of the hydraulic system 100 may be matched to a work cycle of the work machine (e.g., a dig and dump cycle and/or an unloading cycle). For example, energy captured during a boom lowering portion of the work cycle may substantially fill the hydraulic accumulator 120 to capacity, and a boom raising portion of the work cycle may substantially deplete the hydraulic accumulator 120.

In preferred embodiments, the hydraulic system 100 should not perceivably reduce performance of the work machine in comparison to performance of a similar conventional work machine, and the work machine should have the same feel to an operator as the conventional work machine. In certain embodiments, the performance of the work machine will be improved and/or increased upon implementing the hydraulic system 100.

As illustrated at FIG. 1, the hydraulic system 100 includes a hydraulic cylinder 130. The hydraulic cylinder 130 may be a lift cylinder, a boom cylinder, or other type of hydraulic cylinder. The hydraulic cylinder 130 can be used to lift loads against gravity. As illustrated at FIGS. 15 and 16, the hydraulic cylinder 130 may be used as a boom cylinder 830. In the embodiment of FIGS. 15 and 16, a pair of the boom cylinders 830 is included and work together to raise and lower a boom 824 of the wheel loader 800. Thus, as illustrated in the examples of FIGS. 1, 15, and 16, the hydraulic cylinder 130 can be a single cylinder or a plurality of cylinders that function as a set of cylinders. As illustrated at FIG. 17, the hydraulic cylinder 130 may be used as a boom cylinder 830'. In the embodiment of FIG. 17, a pair of the boom cylinders 830' is included and work together to raise and lower a boom 824' of the wheel loader 800'. Thus, as illustrated in the examples of FIGS. 1, 15, 16, and 17 the hydraulic cylinder 130 can be a single cylinder or a plurality of cylinders that function as a set of cylinders.

The hydraulic cylinder 130 includes a cylinder housing 136, a piston 138, and a rod 140 connected to the piston 138. The cylinder housing 136 includes a first port 132 and a second port 134. Upon injecting hydraulic fluid into the first port 132, the rod 140 extends in a direction 152. Upon injecting hydraulic fluid into the second port 134, the rod 140 retracts in a direction 154. The direction 152, as depicted, is an extension direction, and the direction 154, as depicted, is a retraction direction. The cylinder housing 136 extends between a head end 142 and a rod end 144. By selectively injecting hydraulic fluid into the first port 132 and/or the second port 134, the hydraulic cylinder 130 can be controlled and selectively extended and retracted, as desired. The hydraulic fluid injected into the hydraulic cylinder 130 may be provided by a hydraulic pump 110 and/or the hydraulic accumulator 120.

As depicted, a valve set 200 controls flow of the hydraulic fluid into the hydraulic cylinder 130 from the hydraulic pump 110, and a fluid flow control device 224 controls flow of the hydraulic fluid into and out of the hydraulic cylinder 130 from and to the hydraulic accumulator 120. As depicted, the valve set 200 controls flow of the hydraulic fluid out of the hydraulic cylinder 130 to a tank 190 (e.g., by way of a hydraulic fluid flow junction 250). As depicted, the valve set 200 controls flow of the hydraulic fluid out of the hydraulic cylinder 130 to the hydraulic fluid flow junction 250. As depicted, the head end 142 of the hydraulic cylinder 130 includes a functional cross-sectional area $A_H$ that is substantially equal to a cross-sectional area of the piston 138 of the hydraulic cylinder 130, and the rod end 144 of the hydraulic cylinder 130 includes a functional cross-sectional area $A_R$ that is substantially equal to the cross-sectional area of the piston 138 minus a cross-sectional area Ar of the rod 140 of the hydraulic cylinder 130. Thus, $A_R = A_H - Ar$ and $A_H = A_R + Ar$.

As depicted at FIGS. 15 and 16, the boom cylinder 830 is attached to a chassis 816 of the wheel loader 800 at a first end. As depicted, the first end corresponds to the head end 142 of the hydraulic cylinder 130. A first attachment 856 is thereby formed between the cylinder housing 136 of the hydraulic cylinder 130 and the chassis 816. A second attachment 858 is formed between a rod 840 of the boom cylinder 830 and the boom 824 of the wheel loader 800. The boom 824 may thereby be actuated by the boom cylinder 830. As depicted at FIG. 17, the boom cylinder 830' is attached to a chassis 816' of the wheel loader 800' at a first end. As depicted, the first end corresponds to the head end 142 of the hydraulic cylinder 130. A first attachment 856' is thereby formed between the cylinder housing 136 of the hydraulic cylinder 130 and the chassis 816'. A second attachment 858' is formed between a rod 840' of the boom cylinder 830' and the boom 824' of the wheel loader 800'. The boom 824' may thereby be actuated by the boom cylinder 830'. The boom cylinder 830, 830' may be powered by the hydraulic pump 110 and/or the hydraulic accumulator 120. The hydraulic pump 110 may be connected to a prime move 810 (e.g., a diesel engine, an electric motor, etc.) of the wheel loader 800, 800'.

As illustrated at FIG. 1, the hydraulic system 100 also includes a hydraulic cylinder 160. The hydraulic cylinder 160 may be a tilt cylinder, a bucket cylinder, or other type of hydraulic cylinder. The hydraulic cylinder 160 can be used to dump the load carried by the boom 824, 824'. As illustrated at FIGS. 15-17, the hydraulic cylinder 160 may be used as a bucket cylinder 860, 860'. In the embodiments of FIGS. 15-17, a single bucket cylinder 860, 860' tilts the bucket 826, 826' of the wheel loader 800, 800'. In other embodiments, a pair of bucket cylinders work together to tilt the bucket 826, 826'. Thus, the hydraulic cylinder 160 can be a single cylinder or a plurality of cylinders that function as a set of cylinders.

The hydraulic cylinder 160 includes a cylinder housing 166, a piston 168, and a rod 170 connected to the piston 168. The cylinder housing 166 includes a first port 162 and a second port 164. Upon injecting hydraulic fluid into the first port 162, the rod 170 extends in a direction 182. Upon injecting hydraulic fluid into the second port 164, the rod 170 retracts in a direction 184. The direction 182, as depicted, is an extension direction, and the direction 184, as depicted, is a retraction direction. The cylinder housing 166 extends between a head end 172 and a rod end 174. By selectively injecting hydraulic fluid into the first port 162 and/or the second port 164, the hydraulic cylinder 160 can be controlled and selectively extended and retracted, as desired. The hydraulic fluid injected into the hydraulic cylinder 160 may be provided by the hydraulic pump 110 and/or the hydraulic cylinder 130. A valve set 210 controls flow of the hydraulic fluid into and out of the hydraulic cylinder 160.

As depicted at FIGS. 15 and 16, the bucket cylinder 860 is attached to the chassis 816 of the wheel loader 800 at a first end. As depicted, the first end corresponds to the head end 172 of the hydraulic cylinder 160. A first attachment 886 is thereby formed between the cylinder housing 166 of the hydraulic cylinder 160 and the chassis 816. A second attachment 888 is formed between a rod 870 of the bucket cylinder 860 and a bucket linkage 828 of the wheel loader 800. The bucket 826 may be actuated by the bucket linkage 828 in conjunction with the bucket cylinder 860. The bucket cylinder 860 may be powered by the hydraulic pump 110 and/or the boom cylinder(s) 830.

As depicted at FIG. 17, the bucket cylinder 860' is attached to the chassis 816' of the wheel loader 800' at a first end. As depicted, the first end corresponds to the head end 172 of the hydraulic cylinder 160. A first attachment 886', similar to the first attachment 886, is thereby formed between the cylinder housing 166 of the hydraulic cylinder 160 and the chassis 816'. A second attachment 888' is formed between a rod 870' of the bucket cylinder 860' and a bucket linkage 828' of the wheel loader 800'. The bucket 826' may be actuated by the bucket linkage 828' in conjunction with the bucket cylinder 860'. The bucket cylinder 860' may be powered by the hydraulic pump 110 and/or the boom cylinder(s) 830'.

The hydraulic pump 110 may be a variable displacement hydraulic pump. The hydraulic pump 110 may include an inlet 112 and an outlet 114. Hydraulic fluid may be supplied from the tank 190 to the hydraulic pump 110. As depicted, an inlet/outlet 192 of the tank 190 is fluidly connected to the inlet 112 of the hydraulic pump 110. The outlet 114 of the hydraulic pump 110 may be fluidly connected to the valve set 200, the valve set 210, and a valve set 220, described in detail below.

The hydraulic accumulator 120 includes an inlet/outlet 122. The inlet/outlet 122 is fluidly connected to the valve set 220. As depicted at FIGS. 1-12, the valve set 220 includes a fluid flow control device 222, the fluid flow control device 224, and a fluid flow control device 226. The fluid flow control devices 222, 224, 226 can be valves, proportional valves, on-off valves, check valves, variable orifices, etc. The fluid flow control device 222 is fluidly connected between the outlet 114 of the hydraulic pump 110 and the inlet/outlet 122 of the hydraulic accumulator 120. As mentioned above, the fluid flow control device 224 fluidly connects the inlet/outlet 122 of the hydraulic accumulator 120 to the first port 132 of the hydraulic cylinder 130 by way of a fluid passage 150. As depicted, the fluid passage 150 does not pass through any fluid flow control device of the valve set 200. As depicted, the fluid passage 150 passes through the fluid flow control device 224 of the valve set 220, and the fluid flow control device 224 regulates fluid flow through the fluid passage 150, including shutting off fluid flow across the fluid passage 150. In particular, a first line 146 of the fluid passage 150 is connected between the first port 132 of the hydraulic cylinder 130 and a first port 224*a* of the fluid flow control device 224, and a second line 148 of the fluid passage 150 is connected between the inlet/outlet 122 of the hydraulic accumulator 120 and a second port 224*b* of the fluid flow control device 224 (see FIG. 1). The fluid flow control device 226 is fluidly connected between the inlet/outlet 122 of the hydraulic accumulator 120 and the inlet/outlet 192 of the tank 190.

As depicted, the valve set 200 includes a fluid flow control device 202, a fluid flow control device 204, a fluid flow control device 206, and a fluid flow control device 208. The fluid flow control devices 202, 204, 206, 208 can also be valves, proportional valves, on-off valves, check valves, variable orifices, etc. The fluid flow control device 202 of the valve set 200 is fluidly connected between the outlet 114 of the hydraulic pump 110 and the first port 132 of the hydraulic cylinder 130. The fluid flow control device 202 may be directly connected to the first port 132 of the hydraulic cylinder 130, may be connected to the first port 132 of the hydraulic cylinder 130 by way of the first line 146, may be connected to the first port 132 of the hydraulic cylinder 130 by way of a separate line, or may be connected to the first port 132 of the hydraulic cylinder 130 by way of a shared line with the connection of the fluid flow control device 204 to the first port 132, as described in detail below. The fluid flow control device 204 is fluidly connected between the first port 132 of the hydraulic cylinder 130 and the hydraulic fluid flow junction 250. The fluid flow control device 204 may be directly connected to the first port 132 of the hydraulic cylinder 130, may be connected to the first port 132 of the hydraulic cylinder 130 by way of the first line 146, may be connected to the first port 132 of the hydraulic cylinder 130 by way of a separate line, or may be connected to the first port 132 of the hydraulic cylinder 130 by way of the shared line with the connection of the fluid flow control device 202 to the first port 132. The fluid flow control device 206 is fluidly connected between the outlet 114 of the hydraulic pump 110 and the second port 134 of the hydraulic cylinder 130. And, the fluid flow control device 208 is fluidly connected between the second port 134 of the hydraulic cylinder 130 and the hydraulic fluid flow junction 250.

The valve set 210 includes a fluid flow control device 212, a fluid flow control device 214, a fluid flow control device 216, and a fluid flow control device 218. The fluid flow control devices 212, 214, 216, 218 can also be valves, proportional valves, on-off valves, check valves, variable orifices, etc. The fluid flow control device 212 is fluidly connected between the outlet 114 of the hydraulic pump 110 and the first port 162 of the hydraulic cylinder 160. The fluid flow control device 214 is fluidly connected between the first port 162 of the hydraulic cylinder 160 and the hydraulic fluid flow junction 250. The fluid flow control device 216 is fluidly connected between the outlet 114 of the hydraulic pump 110 and the second port 164 of the hydraulic cylinder 160. And, the fluid flow control device 218 is fluidly connected between the second port 164 of the hydraulic cylinder 160 and the hydraulic fluid flow junction 250.

The hydraulic system 100 includes a valve set 230. The valve set 230 is fluidly connected between the inlet/outlet 192 of the tank 190 and the hydraulic fluid flow junction 250. As depicted, the valve set 230 includes a fluid flow control device 232 and a relief valve 234. The fluid flow control device 232 can also be a valve, a proportional valve, an on-off valve, a check valve, a variable orifice, etc. The fluid flow control device 232 is fluidly connected between the hydraulic fluid flow junction 250 and the inlet/outlet 192 of the tank 190. The relief valve 234 is fluidly connected between the hydraulic fluid flow junction 250 and the inlet/outlet 192 of the tank 190.

Figure 2:
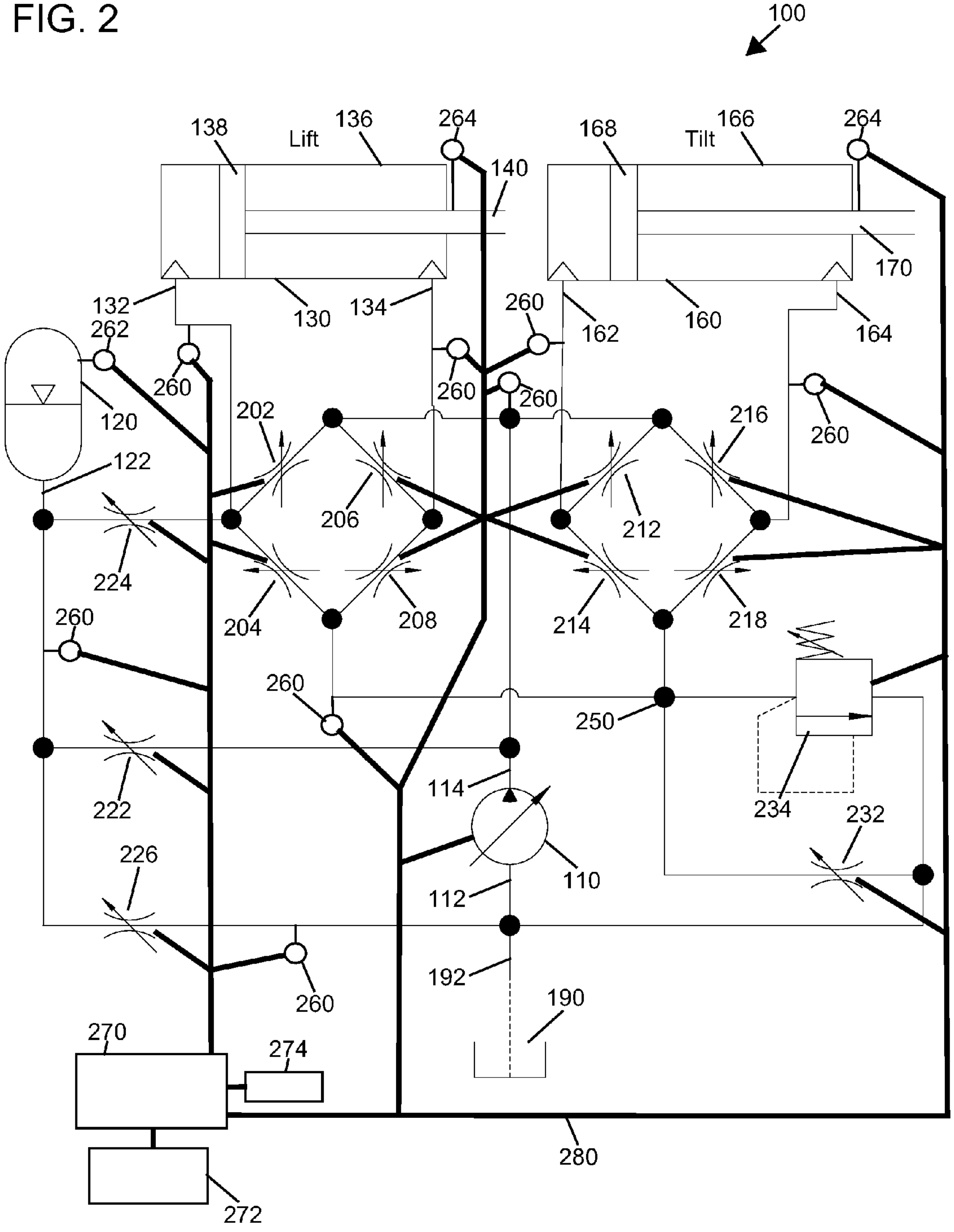
FIG. 2 is a schematic diagram of the hydraulic system of FIG. 1 further illustrating a control system of the hydraulic system.

Turning now to FIG. 2, an example control system is illustrated for the hydraulic system 100. As depicted, the control system includes a plurality of pressure sensors 260, at least one temperature sensor 262, a plurality of position sensors 264, a controller 270, an operator interface 272, memory 274, and a wiring harness 280. As depicted, the controller 270 is connected to the other various components of the control system by the wiring harness 280. In certain embodiments, the controller 270 may include distributed controllers connected to the various components of the control system. For example, a controller area network bus system may be used to control the hydraulic system 100. The various components of the control system may establish one-way communication with the controller 270, and/or the various components may establish two-way communication with the controller 270. For example, the hydraulic pump 110 may receive a control signal from the controller 270. Alternatively, the hydraulic pump 110 may both receive a control signal from the controller 270 and also send a feedback signal to the controller 270. The pressure sensors 260 may monitor hydraulic pressures of the hydraulic system 100 at various locations.

As depicted, the first port 132, the second port 134, the first port 162, the second port 164, the inlet/outlet 122, the outlet 114, the hydraulic fluid flow junction 250, and the inlet 112 may each include one of the pressure sensors 260. The pressure sensors 260 are optional at any or all of the aforementioned locations. The at least one temperature sensor 262 may monitor temperature of compressed gas within the hydraulic accumulator 120. The position sensors 264 may monitor a relative position between the rod 140 and the cylinder housing 136. Likewise, the position sensors 264 may monitor a relative position between the cylinder housing 166 and the rod 170. As depicted at FIGS. 15 and 16, the wheel loader 800 includes an operator station 818. As depicted at FIG. 17, the wheel loader 800' includes an operator station 818'. The operator interface 272 may be mounted within the operator station 818, 818'. The operator may thereby operate the hydraulic system 100 and thereby the wheel loader 800, 800' by interacting with the operator interface 272.

Figure 3:
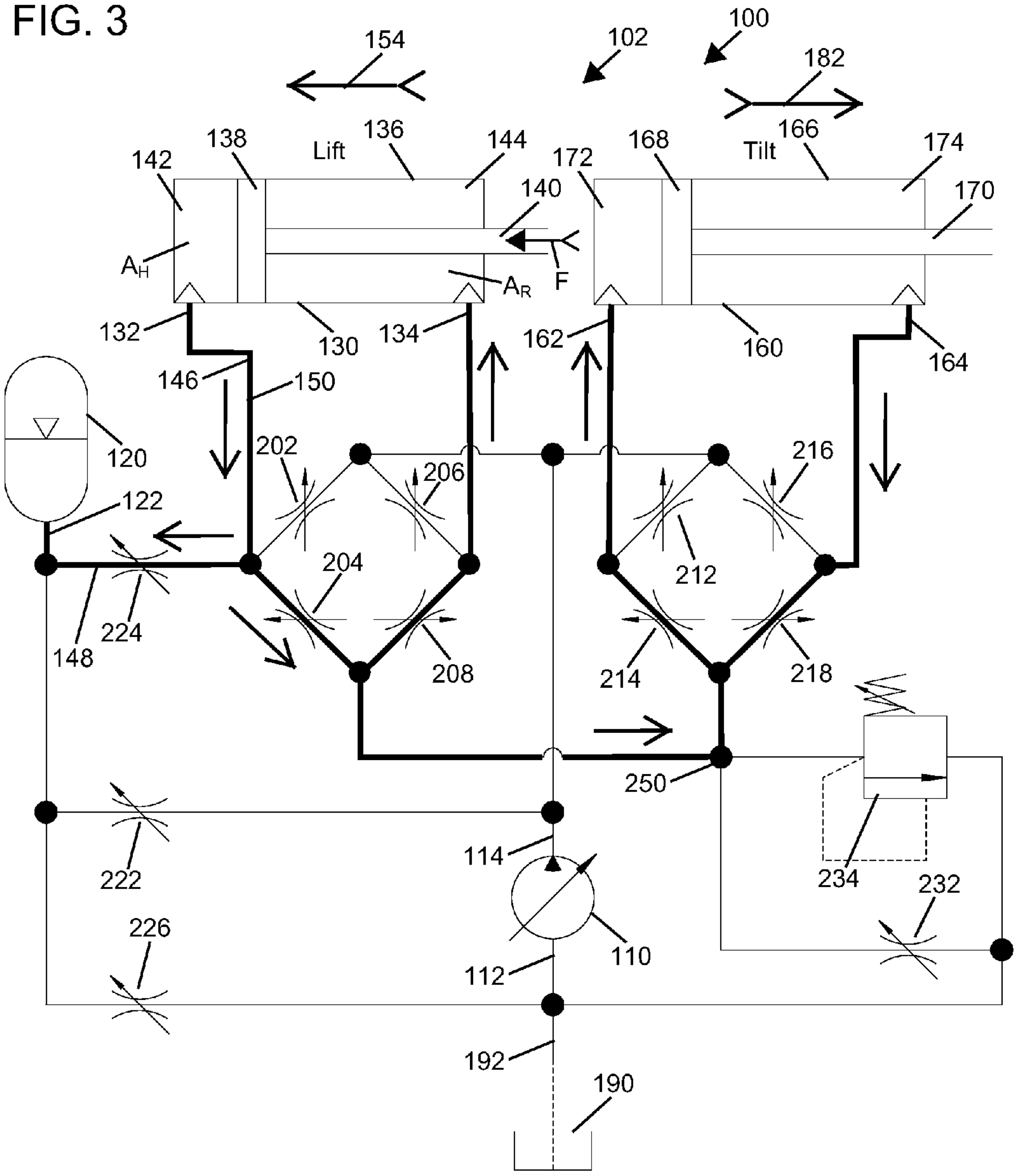
FIG. 3 is a schematic diagram of the hydraulic system of FIG. 1 further illustrating a first mode of the hydraulic system.

Turning now to FIG. 3, an energy capturing mode 102 of the hydraulic system 100 is depicted. In the energy capturing mode 102, energy is recovered from the hydraulic cylinder 130 and stored in the hydraulic accumulator 120. In particular, a load, such as the boom 824 and various loads imposed thereon, moves the rod 140 in the direction 154. This, in turn, forces hydraulic fluid from the first port 132. The hydraulic fluid from the first port 132 may flow through the fluid passage 150, including the fluid flow control device 224, toward the hydraulic accumulator 120 and thereby charge the hydraulic accumulator 120. In addition, the hydraulic fluid from the first port 132 may flow through the fluid flow control device 204 and the fluid flow control device 208 and thereby enter the second port 134. In addition, the hydraulic fluid from the first port 132 may flow through the fluid flow control device 204 and through the fluid flow control device 214 and into the first port 162 and thereby actuate (e.g., extend) the hydraulic cylinder 160 in the direction 182. The hydraulic fluid from the first port 132 may flow through the fluid flow control device 204, through the hydraulic fluid flow junction 250, and through the fluid flow control device 214 and into the first port 162 and thereby actuate (e.g., extend) the hydraulic cylinder 160. The actuation (e.g., extension) of the hydraulic cylinder 160 may cause hydraulic fluid to exit the second port 164. Upon exiting the second port 164, the hydraulic fluid may flow through the fluid flow control device 218 and the fluid flow control device 214 and into the first port 162 of the hydraulic cylinder 160. In certain embodiments, time periods, and/or configurations, the fluid flow control device 214 and/or the fluid flow control device 218 may be closed and/or the hydraulic cylinder 160 may remain stationary.

When hydraulic fluid pressure within the hydraulic accumulator 120 is below a pre-determined pressure and/or when the hydraulic fluid pressure within the hydraulic accumulator 120 is below the pressure within the hydraulic cylinder 130 and an energy capturing mode (e.g., the energy capturing mode 102) is active, the fluid flow control device 224 may open and thereby recover hydraulic energy from the hydraulic cylinder 130. When the hydraulic fluid pressure within the hydraulic accumulator 120 is above a pre-determined pressure and/or when the hydraulic fluid pressure within the hydraulic accumulator 120 is above the pressure within the hydraulic cylinder 130 and an energy capturing mode is active, the fluid flow control device 224 may close.

Assuming negligible friction (e.g., between the piston 138 and the cylinder housing 136) and pressure drop across the fluid flow control device 204, the fluid flow control device 208, and the various hydraulic lines, a given net force F, acting on the rod 140, produces a hydraulic fluid pressure of $F/Ar=F/(A_H-A_R)$ at the head end 142 of the hydraulic cylinder 130 and thereby at the first port 132 in the energy capturing mode 102. The hydraulic fluid pressure $F/(A_H-A_R)$ may be delivered from the hydraulic cylinder 130 to the hydraulic accumulator 120 via the fluid passage 150.

Figure 10:
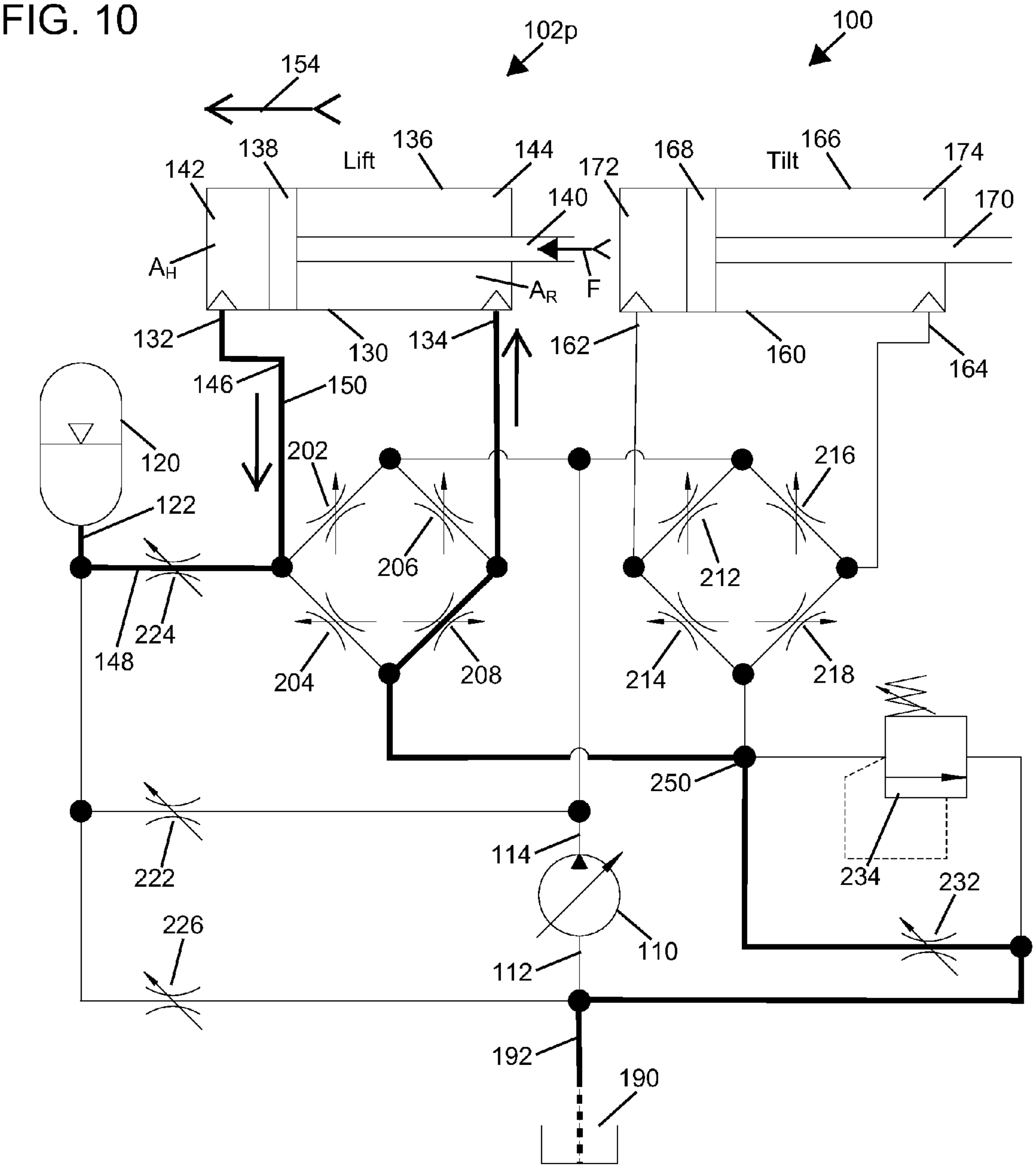
FIG. 10 is a schematic diagram of the hydraulic system of FIG. 1 further illustrating a fifth mode of the hydraulic system.

Turning now to FIG. 10, an energy capturing mode **102*p* of the hydraulic system 100 is depicted. In the energy capturing mode 102*p*, energy is recovered from the hydraulic cylinder 130 and stored in the hydraulic accumulator 120. In particular, the load, such as the boom 824, 824' and various loads imposed thereon, moves the rod 140 in the direction 154. This, in turn, forces hydraulic fluid from the first port 132. The hydraulic fluid from the first port 132 may flow through the fluid passage 150, including the fluid flow control device 224, toward the hydraulic accumulator 120 and thereby charge the hydraulic accumulator 120. The movement of the hydraulic cylinder 130 may cause hydraulic fluid to enter the second port 134 of the hydraulic cylinder 130. In particular, the hydraulic fluid may be drawn from the tank 190 by way of the fluid flow control device 208, the hydraulic fluid flow junction 250, and the fluid flow control device 232**.

Assuming negligible friction and pressure drop across the fluid flow control device 208 and the various hydraulic lines, a given net force F, acting on the rod 140, produces a hydraulic fluid pressure of $F/A_H$ at the head end 142 of the hydraulic cylinder 130 and thereby at the first port 132 in the energy capturing mode **102*p*. The hydraulic fluid pressure $F/A_H$ may be delivered from the hydraulic cylinder 130 to the hydraulic accumulator 120 via the fluid passage 150**.

Figure 9:
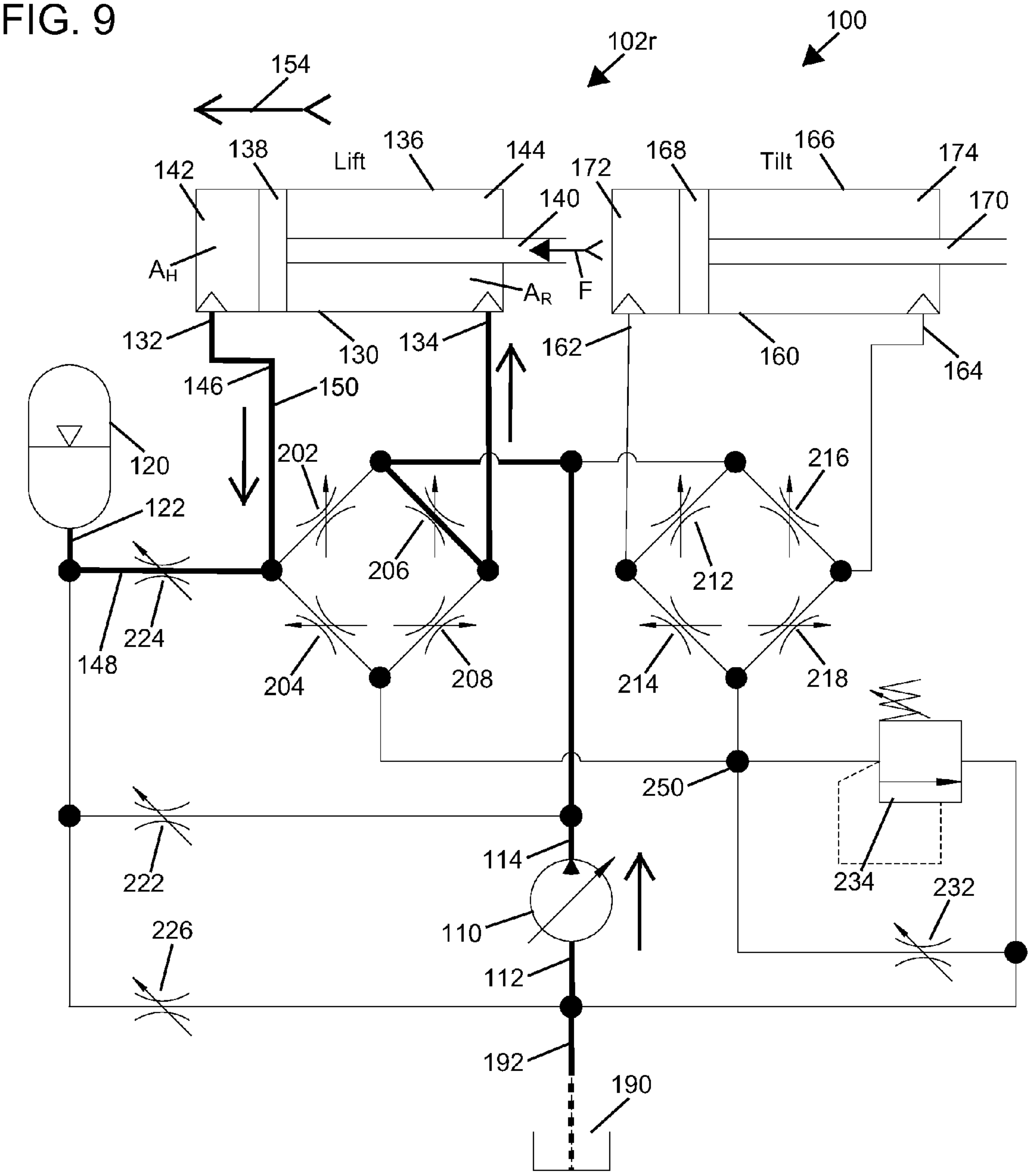
FIG. 9 is a schematic diagram of the hydraulic system of FIG. 1 further illustrating a seventh mode of the hydraulic system.

Turning now to FIG. 9, an energy capturing mode **102*r* of the hydraulic system 100 is depicted. In the energy capturing mode 102*r*, energy is recovered from the hydraulic cylinder 130 and stored in the hydraulic accumulator 120. In particular, the load, such as the boom 824, 824' and various loads imposed thereon, moves the rod 140 in the direction 154. In addition, hydraulic fluid from the pump 110 may enter the second port 134 of the hydraulic cylinder 130. In particular, the hydraulic fluid is drawn by the hydraulic pump 110 from the tank 190 through the inlet/outlet 192 and the inlet 112. The hydraulic pump 110 pressurizes the hydraulic fluid and pumps the hydraulic fluid out of the outlet 114. The hydraulic fluid may then flow through the fluid flow control device 206 and into the second port 134 of the hydraulic cylinder 130. The load on the rod 140 in combination with the hydraulic fluid flow from the pump 110 force hydraulic fluid from the first port 132. The hydraulic fluid from the first port 132 may flow through the fluid passage 150, including the fluid flow control device 224, toward the hydraulic accumulator 120 and thereby charge the hydraulic accumulator 120**.

Assuming negligible friction and pressure drop across the fluid flow control device 206 and the various hydraulic lines, a given net force F, acting on the rod 140, produces a hydraulic fluid pressure of $F/A_H$ at the head end 142 of the hydraulic cylinder 130 and thereby at the first port 132 in the energy capturing mode **102*r*, and pump pressure Pp from the hydraulic pump 110 produces a hydraulic fluid pressure $Pc=Pp\times(A_R/A_H)$ at the head end 142 of the hydraulic cylinder 130 and thereby at the first port 132 in the energy capturing mode 102*r*. In combination, a total pressure $Pt=F/A_H+Pc=F/A_H+Pp\times(A_R/A_H)$ is produced at the head end 142** of the hydraulic cylinder 130 and thereby at the first port 132 in the energy capturing mode 102*r*. The total pressure $F/A_H+Pp\times(A_R/A_H)$ may be delivered from the hydraulic cylinder 130 to the hydraulic accumulator 120 via the fluid passage 150.

When employed on the example wheel loaders 800, 800', the energy capturing modes 102, 102*p*, 102*r* may provide several functions. These functions may include capturing kinetic and/or potential energy from the boom 824, 824' and storing at least a portion of the captured energy in the hydraulic accumulator 120. In addition, hydraulic fluid may be supplied to the second port 134 to prevent cavitation of the hydraulic cylinder 130, 830, 830'. In addition, by actuating the hydraulic cylinder 160, 860, 860' the bucket 826, 826' may be simultaneously actuated with a portion of the energy.

Figure 4:
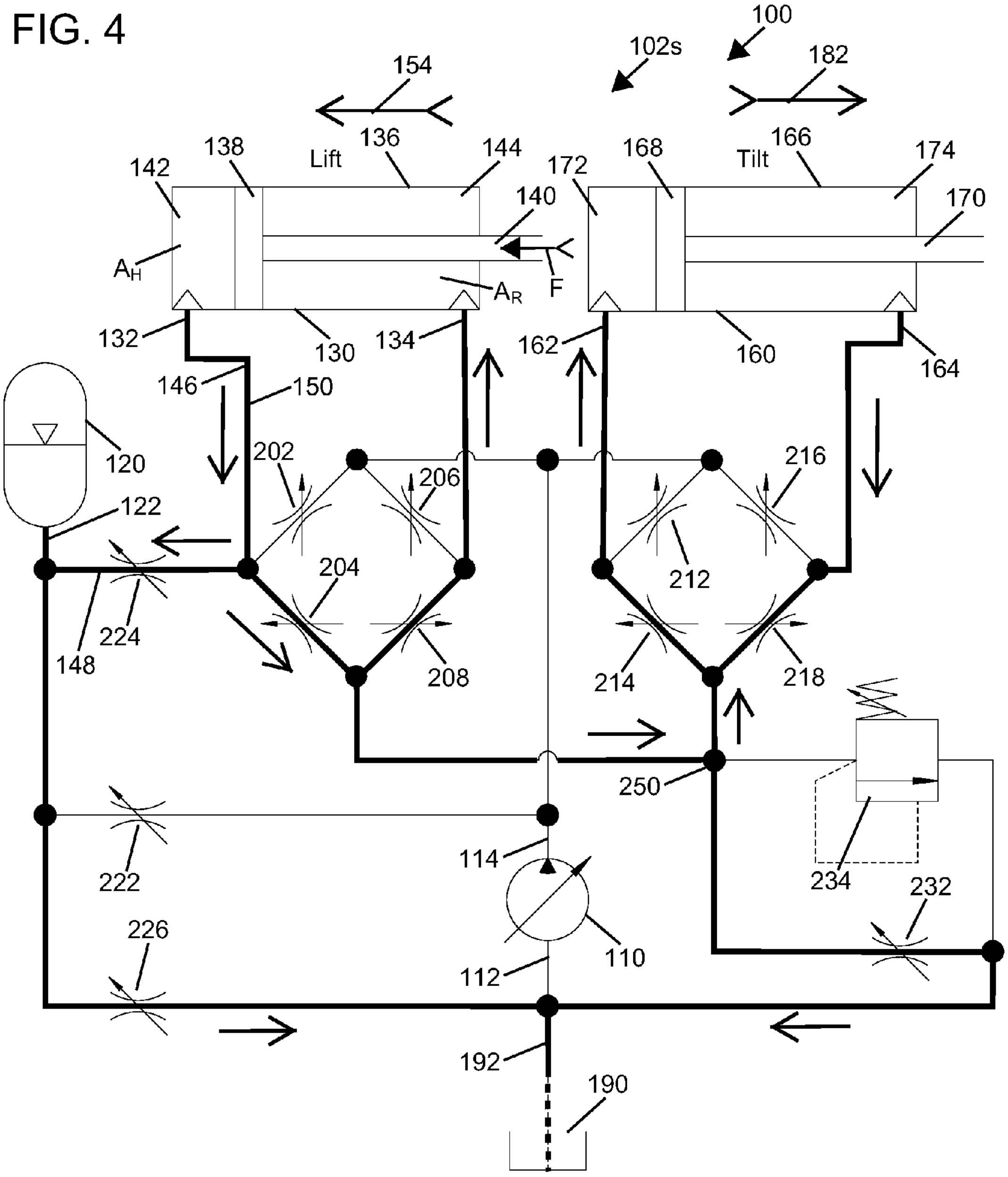
FIG. 4 is a schematic diagram of the hydraulic system of FIG. 1 further illustrating a second mode of the hydraulic system.

As depicted at FIG. 4, the hydraulic cylinder 160 is extended by the portion of the energy. As depicted at FIGS. 15 and 16, extending the hydraulic cylinder 160, 860 tilts the bucket 826 downward. In other embodiments, the hydraulic valving may be rearranged and thereby the portion of the energy can cause the hydraulic cylinder 160, 860 to retract (i.e., the rod 170 moves in the direction 184, as illustrated at FIG. 1). As depicted at FIG. 17, extending the hydraulic cylinder 160, 860' (e.g., by moving the rod 170, 870' in the direction 182) tilts the bucket 826' in an upward direction 825 as the boom 824' moves in a downward direction in conjunction with the rod 840' moving in the direction 154. The bucket linkage 828' may be a "Z-bar" bucket linkage, as depicted at FIG. 17, that transforms extension of the hydraulic cylinder 160, 860' (i.e., the rod 170, 870' moves in the direction 182) into tilting of the bucket 826' in the upward direction 825. Such simultaneous movements are particularly useful when the work machine is the wheel loader 800'. The "Z-bar" bucket linkage includes a rocking member 827 rotatably mounted on the boom 824' between a first end 827*a* and a second end 827*b*. The first end 827*a* includes the second attachment 888'. The second end 827*b* is rotatably connected to a bucket link 829 at a second end 829*b* of the bucket link 829. A first end 829*a* of the bucket link 829 is rotatably connected to the bucket 826'. Extending the hydraulic cylinder 160, 860' (e.g., by moving the rod 170, 870' in the direction 182) rocks the rocking member 827 in a direction 823.

A typical cycle of the wheel loader 800, 800' includes the wheel loader 800, 800' driving into a pile of material followed by the boom 824, 824' raising the bucket 826, 826'. The wheel loader 800, 800' is then driven to a dumping location (e.g., a hauling truck) with the bucket 826, 826' above an elevation of the dumping location. The bucket cylinder 160, 860, 860' is then moved in the direction 182 to tilt the bucket 826, 826' via a connection through the bucket linkage 828, 828'. Upon the bucket 826, 826' being emptied of the material at the dumping location, the wheel loader 800, 800' is moved clear of the dumping location, and the boom 824, 824' is lowered to return the bucket 826, 826' to a loading (e.g., a digging) configuration. The downward movement of the boom 824, 824' and the upward movement of the bucket 826, 826' occur simultaneously, and the movement of the bucket 826, 826' is provided by the energy from the boom cylinder 130, 830, 830'. Such a coordinated movement may be referred to as a "return to dig" movement or a "return to dig" operation. The "return to dig" operation may be a pre-defined position based movement. The "return to dig" movement may be activated, for example, when the boom 824, 824' is fully up and the bucket 826, 826' is fully down.

Turning now to FIG. 4, a variation of the energy capturing mode 102 is illustrated. As depicted, a mode 102*s* is similar to the energy capturing mode 102, but includes provisions to accommodate a full hydraulic accumulator 120. In addition, or separately, the mode 102*s* may include a provision for when the hydraulic cylinder 160 cannot accept all of the flow through the hydraulic fluid flow junction 250. In particular, the hydraulic fluid flow through the fluid passage 150 can be at least partially diverted through the fluid flow control device 226 and into the tank 190 through the inlet/outlet 192. Similarly, the hydraulic fluid flow through the hydraulic fluid flow junction 250 may at least partially be diverted through the fluid flow control device 232 and into the tank 190 via the inlet/outlet 192.

As illustrated at FIGS. 3 and 4, the energy capturing mode 102 and the energy capturing mode 102*s* may channel hydraulic fluid flow from the first port 132 through the fluid flow control device 204 and the fluid flow control device 208 into the second port 134. The head end 142 has a higher hydraulic fluid displacement rate than the rod end 144 when the piston 138 is moved as a result of the functional cross-sectional area $A_H$ being greater than the functional cross-sectional area $A_R$. When the rod 140 is moved in the direction 154, the connection between the first port 132 and the second port 134 increases the pressure generated at the first port 132 under a given load at the rod 140 in the direction 154 (e.g., the given net force F). In particular, the hydraulic fluid pressure $F/(A_H-A_R)$ when the first port 132 and the second port 134 are connected may be greater than the hydraulic fluid pressure $F/A_H$ when the first port 132 and the second port 134 are disconnected and the second port 134 is connected, for example, to the tank 190.

The increased hydraulic fluid pressure $F/(A_H-A_R)$ can thereby charge the hydraulic accumulator 120 at a higher pressure given the same load (e.g., the given net force F) at the rod 140 in the direction 154. The increased hydraulic fluid pressure, $F/(A_H-A_R)=F/Ar$, results from an effective area of the hydraulic cylinder 130 becoming the cross-sectional area Ar of the rod 140 (see FIG. 1). In certain embodiments, the hydraulic fluid displacement rate of the head end 142 can be higher than the hydraulic fluid displacement rate of the rod end 144 by a factor that ranges between about 1.1 to 1.5 or about 1.1-3. In certain embodiments, the cross-sectional area $A_H$ of the head end 142 can be higher than the cross-sectional area $A_R$ of the rod end 144 by a factor that ranges between about 1.1 to 1.5 or about 1.1-3. The pressure at the first port 132 is thereby amplified by connecting the first port 132 to the second port 134, via the fluid flow control device 204 and the fluid flow control device 208, in comparison to the pressure that would otherwise be generated at the first port 132 from a load placed on the rod 140 in the direction 154.

Figure 5:
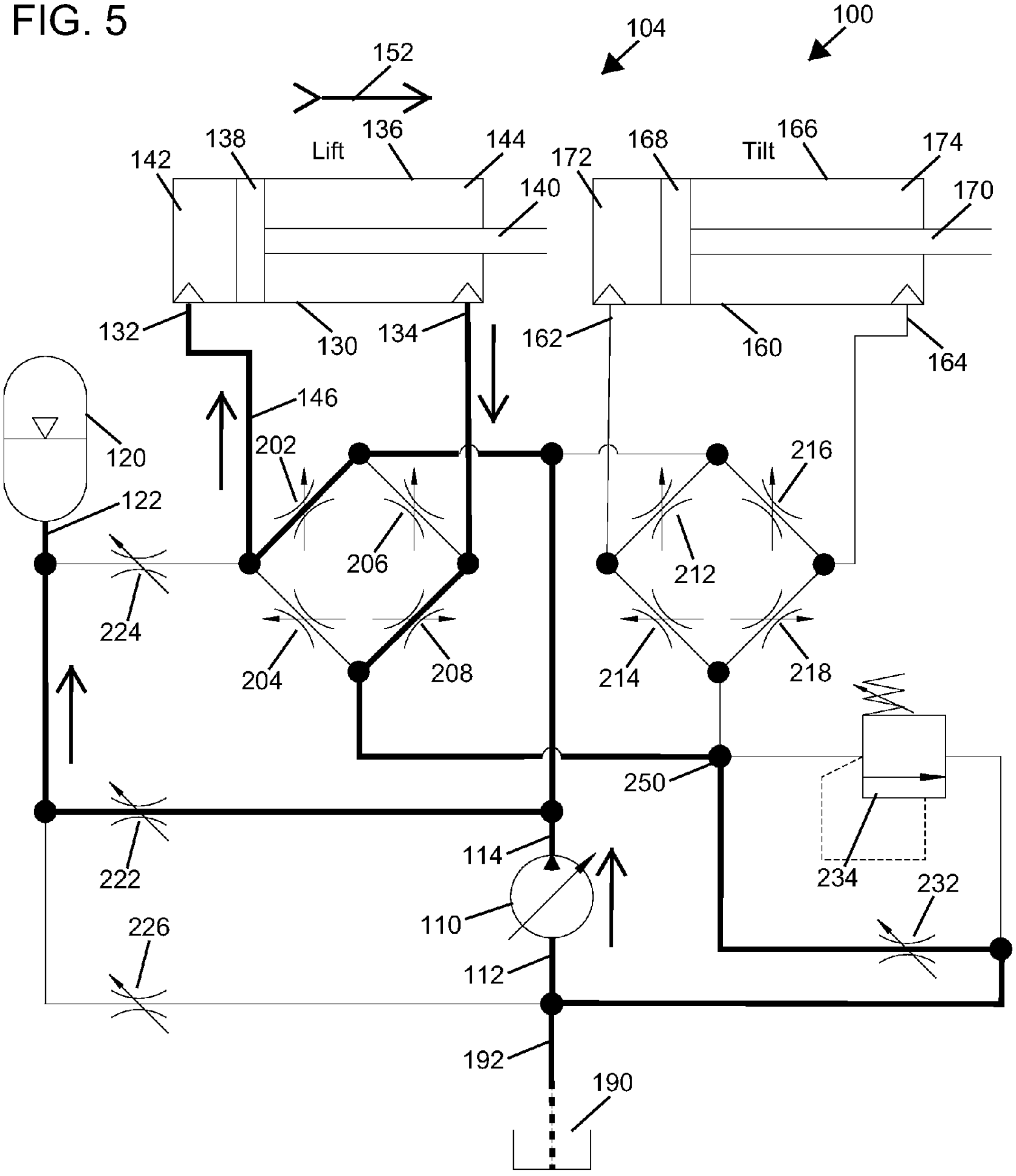
FIG. 5 is a schematic diagram of the hydraulic system of FIG. 1 further illustrating a third mode of the hydraulic system.
Figure 6:
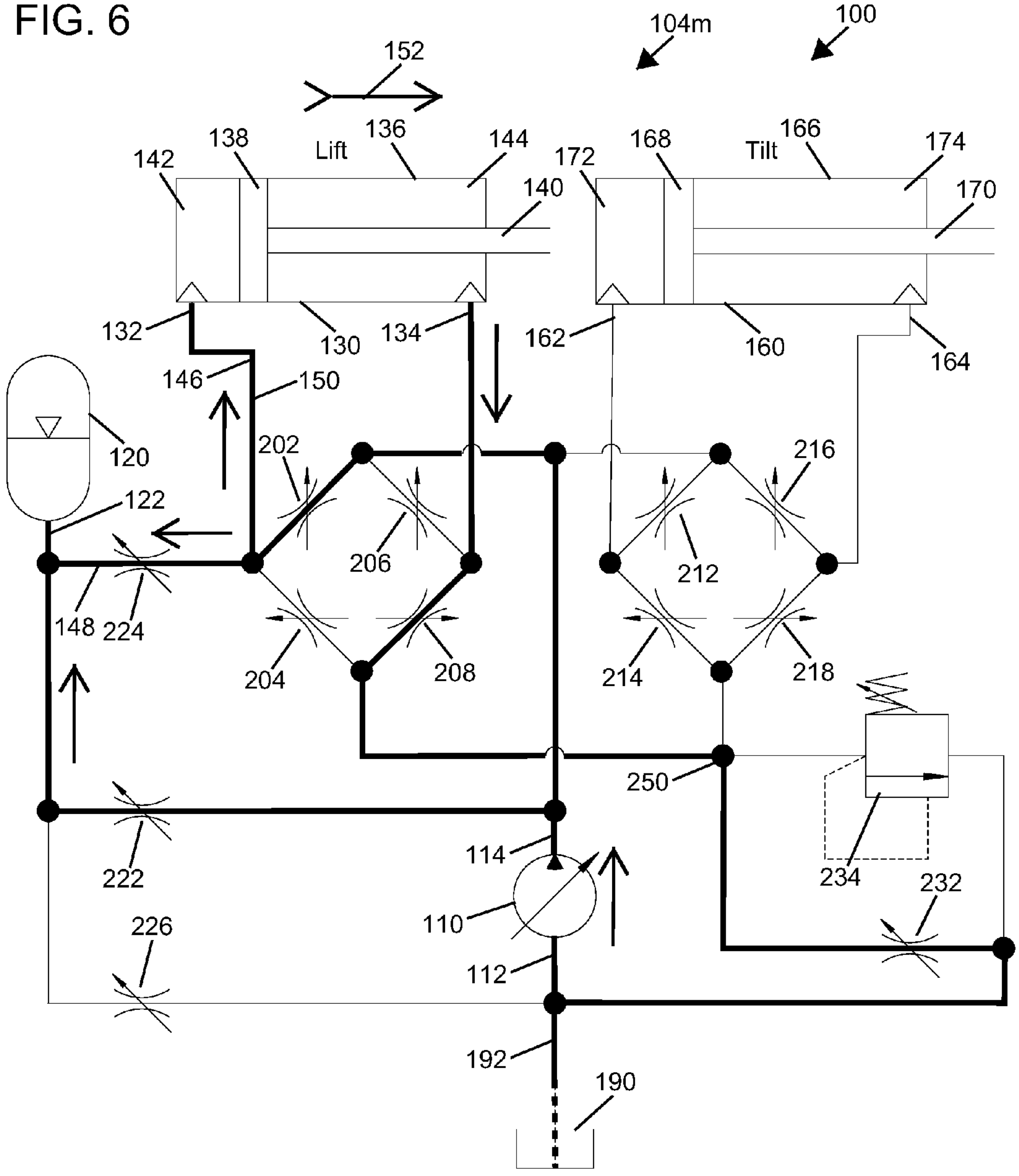
FIG. 6 is a schematic diagram of the hydraulic system of FIG. 1 further illustrating a fourth mode of the hydraulic system.

FIGS. 5 and 6 illustrate a mode 104 and a mode 104*m*, respectively. The modes 104, 104*m* result in charging and/or precharging the hydraulic accumulator 120. The hydraulic accumulator 120 may be normally pressurized (i.e., precharged) to a pre-defined value. When energy capturing modes 102, 102*s*, 102*r*, 102*p* are activated, the hydraulic accumulator 120 may be allowed to gain more pressure than the pre-defined value and thereby may be filled above the normal resting capacity. Any excess flow to the hydraulic accumulator 120 may be passed to the tank 190 via the fluid flow control device 226.

In the depicted embodiment, the hydraulic pump 110 is used to charge and/or precharge the hydraulic accumulator 120. The precharging can be done simultaneously with the actuation of the hydraulic cylinder 130. As illustrated at FIG.

5, hydraulic fluid is drawn by the hydraulic pump 110 from the tank 190 through the inlet/outlet 192 and the inlet 112. The hydraulic pump 110 pressurizes the hydraulic fluid and pumps the hydraulic fluid out of the outlet 114. At least a portion of the hydraulic fluid flows through the fluid flow control device 222 and into the inlet/outlet 122 of the hydraulic accumulator 120 and thereby charges the hydraulic accumulator 120. Another portion of the hydraulic fluid from the hydraulic pump 110 may flow through the fluid flow control device 202 and into the first port 132 of the hydraulic cylinder 130. The hydraulic fluid flow into the hydraulic cylinder 130 causes the hydraulic cylinder 130 to extend and expel hydraulic fluid from the second port 134. The expelled hydraulic fluid from the second port 134 flows through the fluid flow control device 208, through the hydraulic fluid flow junction 250, and through the fluid flow control device 232 into the inlet/outlet 192 of the tank 190.

FIG. 6 is similar to FIG. 5 except for hydraulic fluid flow from the fluid flow control device 202 also flowing through the fluid flow control device 224 and into the inlet/outlet 122 of the hydraulic accumulator 120. The mode 104*m* can be used to equalize hydraulic fluid pressure between the head end 142 and the hydraulic accumulator 120.

Figure 7:
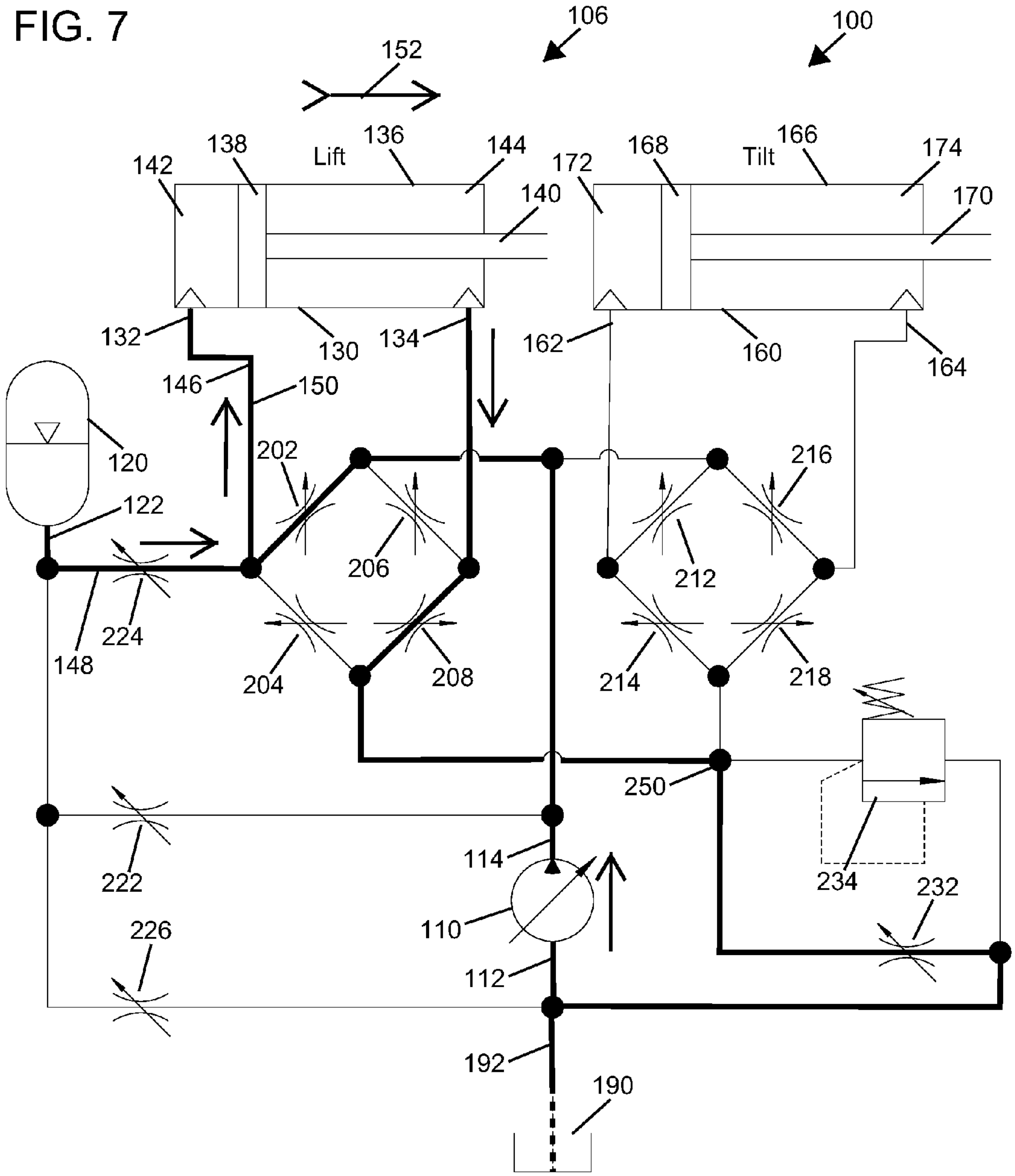
FIG. 7 is a schematic diagram of the hydraulic system of FIG. 1 further illustrating a fifth mode of the hydraulic system.

As illustrated at FIG. 7, a mode 106 of the hydraulic system 100 regenerates (i.e., recycles) hydraulic fluid energy stored in the hydraulic accumulator 120 and uses the energy to extend the hydraulic cylinder 130 (e.g., when boom lift is commanded). In particular, when hydraulic fluid pressure within the hydraulic accumulator 120 is above a pre-determined pressure and/or when the hydraulic fluid pressure within the hydraulic accumulator 120 is above the pressure required by the hydraulic cylinder 130, the fluid flow control device 224 may open and thereby relieve hydraulic load from the hydraulic pump 110. A signal (e.g., a digital signal) may be sent to a load sense controller of the hydraulic pump 110 to coordinate the opening of the fluid flow control device 224 (e.g., subtracting the accumulator supplied flow).

As illustrated at FIGS. 15-17, extending the hydraulic cylinder 130, 830, 830', raises the boom 824, 824' and thereby raises the bucket 826, 826'. The hydraulic pump 110 may be used to supplement hydraulic fluid flow into the hydraulic cylinder 130 and thereby assist in extending the hydraulic cylinder 130. In particular, hydraulic fluid flows from the inlet/outlet 122 of the hydraulic accumulator 120 and through the fluid passage 150, including the fluid flow control device 224, and into the first port 132 of the hydraulic cylinder 130. Additional hydraulic fluid flow may be transferred from the inlet/outlet 192 of the tank 190 into the inlet 112 of the hydraulic pump 110. The hydraulic pump 110 pressurizes the hydraulic fluid and forces the hydraulic fluid through the outlet 114 and the fluid flow control device 202 and into the first port 132. As the hydraulic cylinder 130 extends, hydraulic fluid is expelled from the rod end 144 through the second port 134, the fluid flow control device 208, the hydraulic fluid flow junction 250, and the fluid flow control device 232, and into the tank 190 through the inlet/outlet 192. When hydraulic fluid pressure within the hydraulic accumulator 120 reaches a pre-determined pressure and/or when the hydraulic fluid pressure within the hydraulic accumulator 120 reduces to below the pressure required by the hydraulic cylinder 130, the fluid flow control device 224 may close and thereby transfer hydraulic load to the hydraulic pump 110. A signal (e.g., a digital signal) may be sent to the load sense controller of the hydraulic pump 110 to coordinate the closing of the fluid flow control device 224 (e.g., adding back the accumulator supplied flow that is now depleted).

Figure 8:
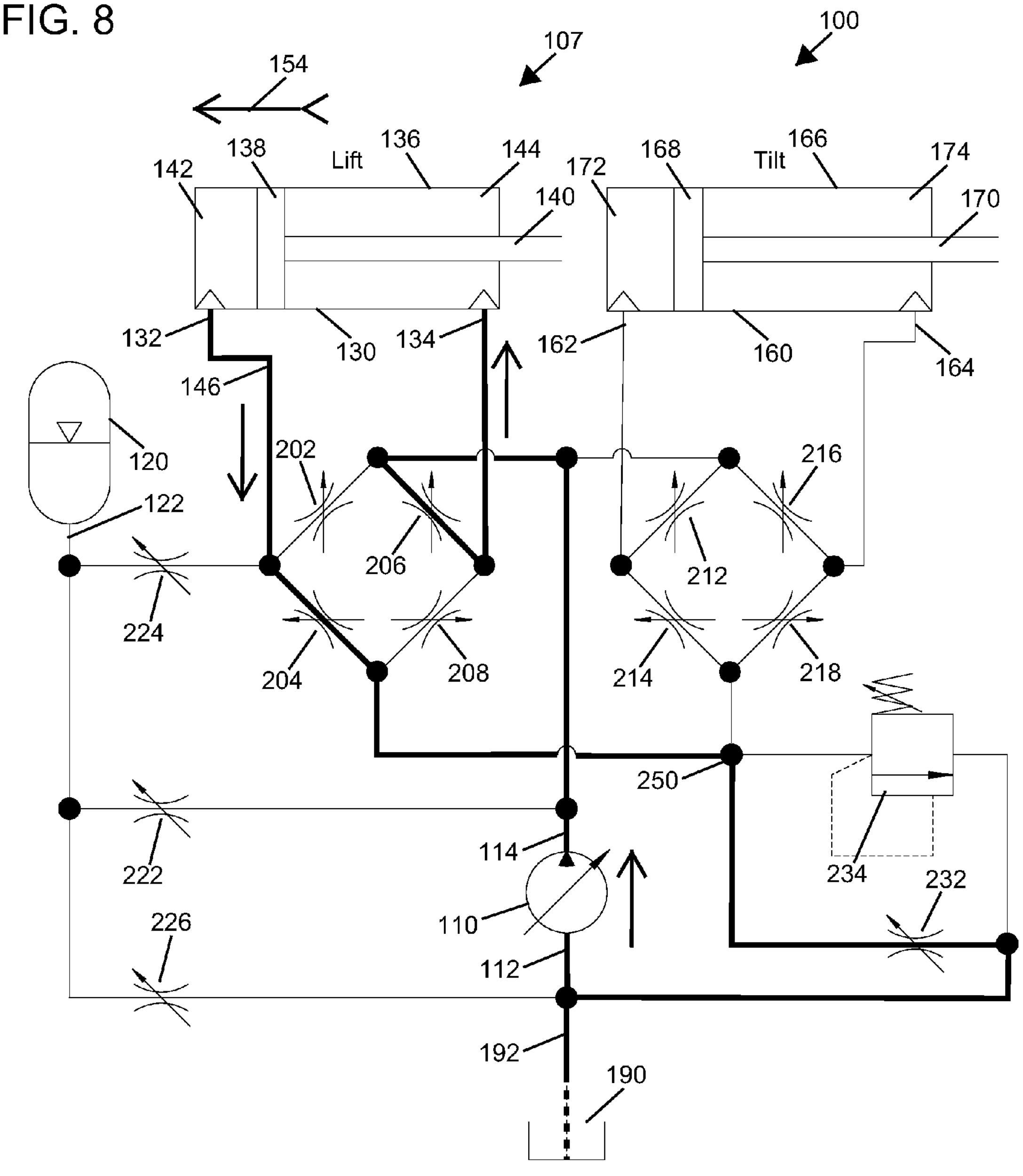
FIG. 8 is a schematic diagram of the hydraulic system of FIG. 1 further illustrating a sixth mode of the hydraulic system.

As illustrated at FIG. 8, a mode 107 of the hydraulic system 100 retracts the hydraulic cylinder 130 under hydraulic fluid pressure from the pump 110. In particular, hydraulic fluid flow may be transferred from the inlet/outlet 192 of the tank 190 into the inlet 112 of the hydraulic pump 110. The hydraulic pump 110 pressurizes the hydraulic fluid and forces the hydraulic fluid through the outlet 114 and the fluid flow control device 206 and into the second port 134 of the hydraulic cylinder 130. As the hydraulic cylinder 130 retracts with the piston 138 moving in the direction 154, hydraulic fluid is expelled from the head end 142 through the first port 132, the fluid flow control device 204, the hydraulic fluid flow junction 250, and the fluid flow control device 232, and into the tank 190 through the inlet/outlet 192.

Figure 11:
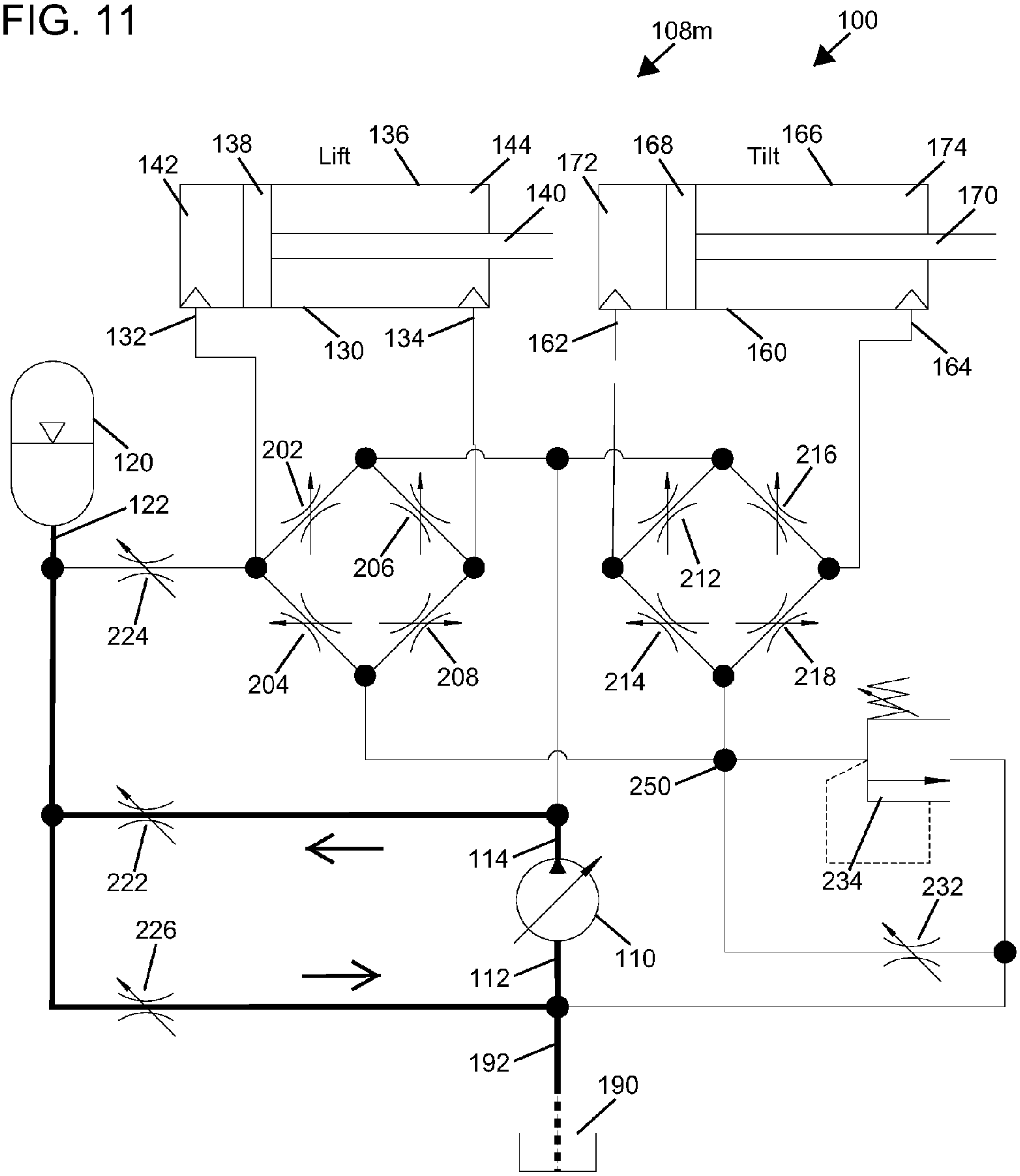
FIG. 11 is a schematic diagram of the hydraulic system of FIG. 1 further illustrating a sixth mode of the hydraulic system.

As illustrated at FIG. 11, the hydraulic system 100 includes a mode 108*m*. The mode 108*m* may be used to set hydraulic fluid pressure of the hydraulic accumulator 120 to a desired value. In particular, the mode 108*m* may be used to match the hydraulic fluid pressure of the hydraulic accumulator 120 to the hydraulic fluid pressure in the head end 142. Matching the hydraulic pressures between the hydraulic accumulator 120 and the head end 142 may be done in preparation for the hydraulic system 100 going into a mode 108, described in detail below. To increase the hydraulic fluid pressure of the hydraulic accumulator 120, hydraulic fluid can be drawn from the tank 190 through the inlet/outlet 192 into the inlet 112 of the hydraulic pump 110. The hydraulic pump 110 pressurizes the hydraulic fluid and pumps the hydraulic fluid through the outlet 114 and through the fluid flow control device 222 into the inlet/outlet 122 of the hydraulic accumulator 120. To lower the hydraulic fluid pressure of the hydraulic accumulator 120, hydraulic fluid can be released from the hydraulic accumulator 120 through the inlet/outlet 122 and the fluid flow control device 226 and into the inlet/outlet 192 of the tank 190. The hydraulic fluid pressure difference between the hydraulic accumulator 120 and the head end 142 of the hydraulic cylinder 130 can be balanced before the fluid flow control device 224, and thereby the fluid passage 150, is opened.

Figure 12:
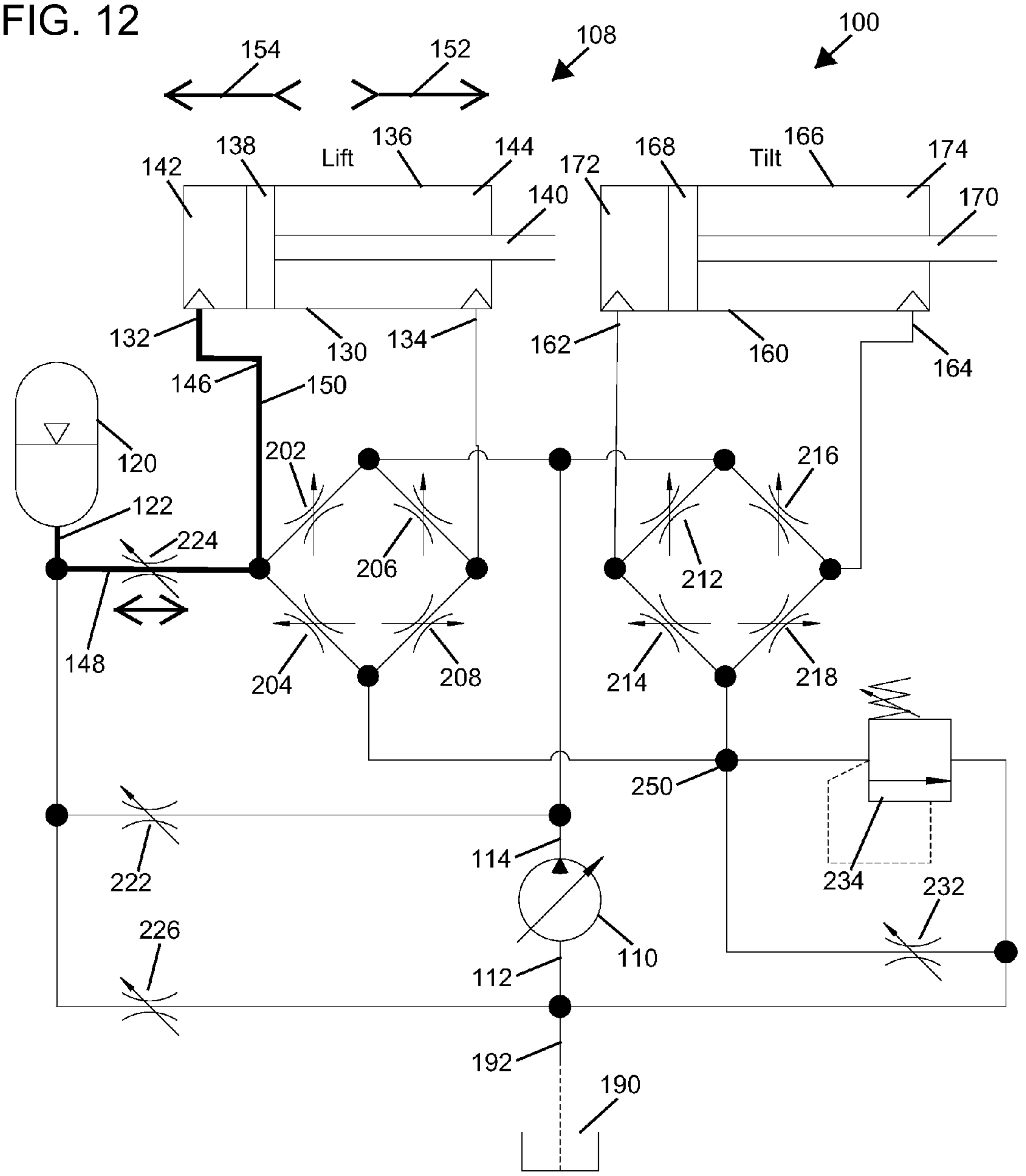
FIG. 12 is a schematic diagram of the hydraulic system of FIG. 1 further illustrating a seventh mode of the hydraulic system.

As illustrated at FIG. 12, the hydraulic system 100 can provide suspension to the work machine in the suspension mode 108. As illustrated at FIGS. 15-17, the hydraulic cylinder 130, 830, 830' supports the boom 824, 824' and thereby supports the bucket 826, 826'. As the wheel loader 800, 800' moves across uneven ground or other obstacles, dynamic movement of the boom 824, 824' and the bucket 826, 826' may occur. By connecting the hydraulic cylinder 130, 830, 830' to the hydraulic accumulator 120 via the fluid passage 150, the hydraulic cylinder 130 can provide a spring-like behavior between the first attachment 856, 856' and the second attachment 858, 858'. The spring-like behavior allows the boom 824, 824' to accommodate the wheel loader 800, 800' as the wheel loader 800, 800' moves over uneven terrain and/or other obstacles. In addition to the spring-like behavior, the fluid flow control device 224 can provide damping of the movement of the boom 824, 824' as hydraulic fluid flows through the fluid passage 150. In particular, hydraulic fluid flowing through the fluid flow control device 224 may be throttled in one or in both flow directions and thereby dissipate energy to dampen the hydraulic cylinder 130, 830, 830'. In particular, the hydraulic cylinder 130, 830, 830' may move in the directions 152, 154. This movement of the rod 140 of the hydraulic cylinder 130 causes hydraulic fluid to be transferred between the head end 142 and the hydraulic accumulator 120 through the first port 132, the fluid passage 150 including the fluid flow control device 224, and the inlet/outlet 122. The fluid passage 150 can be directly fluidly connected to the inlet/outlet 122 and also be directly fluidly connected to the first port 132. The fluid flow control device 224 of the fluid passage 150 can be a single hydraulic fluid flow control device. The fluid flow control device 224 may be the sole hydraulic fluid flow control device along the fluid passage 150.

According to the principles of the present disclosure, a hydraulic system 400 can be derived as a subset of the hydraulic system 100 and function, in certain modes, independent of a pump. In particular, as illustrated at FIG. 13, the hydraulic system 400 includes a hydraulic cylinder 430 similar to the hydraulic cylinder 130 and a hydraulic cylinder 460 similar to the hydraulic cylinder 160. The hydraulic cylinder 430 includes a first port 432 similar to the first port 132 and a second port 434 similar to the second port 134. Likewise, the hydraulic cylinder 460 includes a first port 462 similar to the first port 162 and a second port 464 similar to the second port 164.

The hydraulic system 400 further includes a hydraulic accumulator 420 similar to the hydraulic accumulator 120. In the illustrated embodiment of FIG. 13, the hydraulic accumulator 420 includes a first hydraulic accumulator 420*a* and a second hydraulic accumulator 420*b*. In other embodiments, the hydraulic accumulator 120 may include two or more hydraulic accumulators. In other embodiments, the hydraulic accumulator 420 may include three or more hydraulic accumulators. In other embodiments, the hydraulic accumulator 420 may include a single hydraulic accumulator. The hydraulic accumulator 420 includes an inlet/outlet 422 similar to the inlet/outlet 122. The first hydraulic accumulator 420*a* can have a different spring and/or gas charge than the second hydraulic accumulator 420*b*. The first hydraulic accumulator 420*a* can be charged and discharged in different stages than the second hydraulic accumulator 420*b*. The charging and discharging stages of the first hydraulic accumulator 420*a* and the second hydraulic accumulator 420*b* can overlap each other or can be substantially sequential. By having the first hydraulic accumulator 420*a* and the second hydraulic accumulator 420*b*, the hydraulic system 400 can match various and varying loads of the hydraulic cylinder 430. By having the first hydraulic accumulator 420*a* and the second hydraulic accumulator 420*b*, the hydraulic system 400 can match modes (e.g., mode 102 and 102*p* and/or a high pressure mode and a low pressure mode) with the first hydraulic accumulator 420*a* and the second hydraulic accumulator 420*b*.

The hydraulic system 400 further includes a tank 490 similar to the tank 190. The tank 490 includes an inlet/outlet 492 similar to the inlet/outlet 192. The hydraulic system 400 includes a fluid flow control device 504 similar to the fluid flow control device 204, a fluid flow control device 508 similar to the fluid flow control device 208, a fluid flow control device 514 similar to the fluid flow control device 214, a fluid flow control device 524 similar to the fluid flow control device 224, a fluid flow control device 526 similar to the fluid flow control device 226, and a fluid flow control device 532 similar to the fluid flow control device 232. The hydraulic system 400 further includes a hydraulic fluid flow junction 550 similar to the hydraulic fluid flow junction 250 and a relief valve 534 similar to the relief valve 234. The hydraulic system 400 further includes a fluid passage 450 similar to the fluid passage 150. The fluid passage 450 similarly includes a first line 446, similar to the first line 146, and a second line 448, similar to the second line 148. In the present paragraph, the term similar indicates a similar component and a similar function within the hydraulic system

400. The fluid flow control device 508 and the fluid flow control device 514 are illustrated at FIG. 13 as check valves.

According to the principles of the present disclosure, a hydraulic system 600 can be derived as a subset of the hydraulic system 100. In particular, as illustrated at FIG. 14, the hydraulic system 600 includes a hydraulic pump 610 similar to the hydraulic pump 110. The hydraulic pump 610 includes an inlet 612 and an outlet 614 similar to the inlet 112 and the outlet 114, respectively. The hydraulic system 600 further includes a hydraulic cylinder 630 similar to the hydraulic cylinder 130. The hydraulic cylinder 630 includes a first port 632 similar to the first port 132 and a second port 634 similar to the second port 134. The hydraulic system 600 further includes a hydraulic accumulator 620 similar to the hydraulic accumulator 120. The hydraulic accumulator 620 includes an inlet/outlet 622 similar to the inlet/outlet 122. The hydraulic system 600 includes a tank 690 similar to the tank 190. The tank 690 includes an inlet/outlet 692 similar to the inlet/outlet 192. The hydraulic system 600 includes a fluid flow control device 708 similar to the fluid flow control device 208, a fluid flow control device 722 similar to the fluid flow control device 222, a fluid flow control device 724 similar to the fluid flow control device 224, and a fluid flow control device 726 similar to the fluid flow control device 226. The hydraulic system 600 further includes a fluid passage 650 similar to the fluid passage 150. The fluid passage 650 similarly includes a first line 646, similar to the first line 146, and a second line 648, similar to the second line 148. In the present paragraph, the term similar indicates a similar component and a similar function within the hydraulic system 600.

Figure 18:
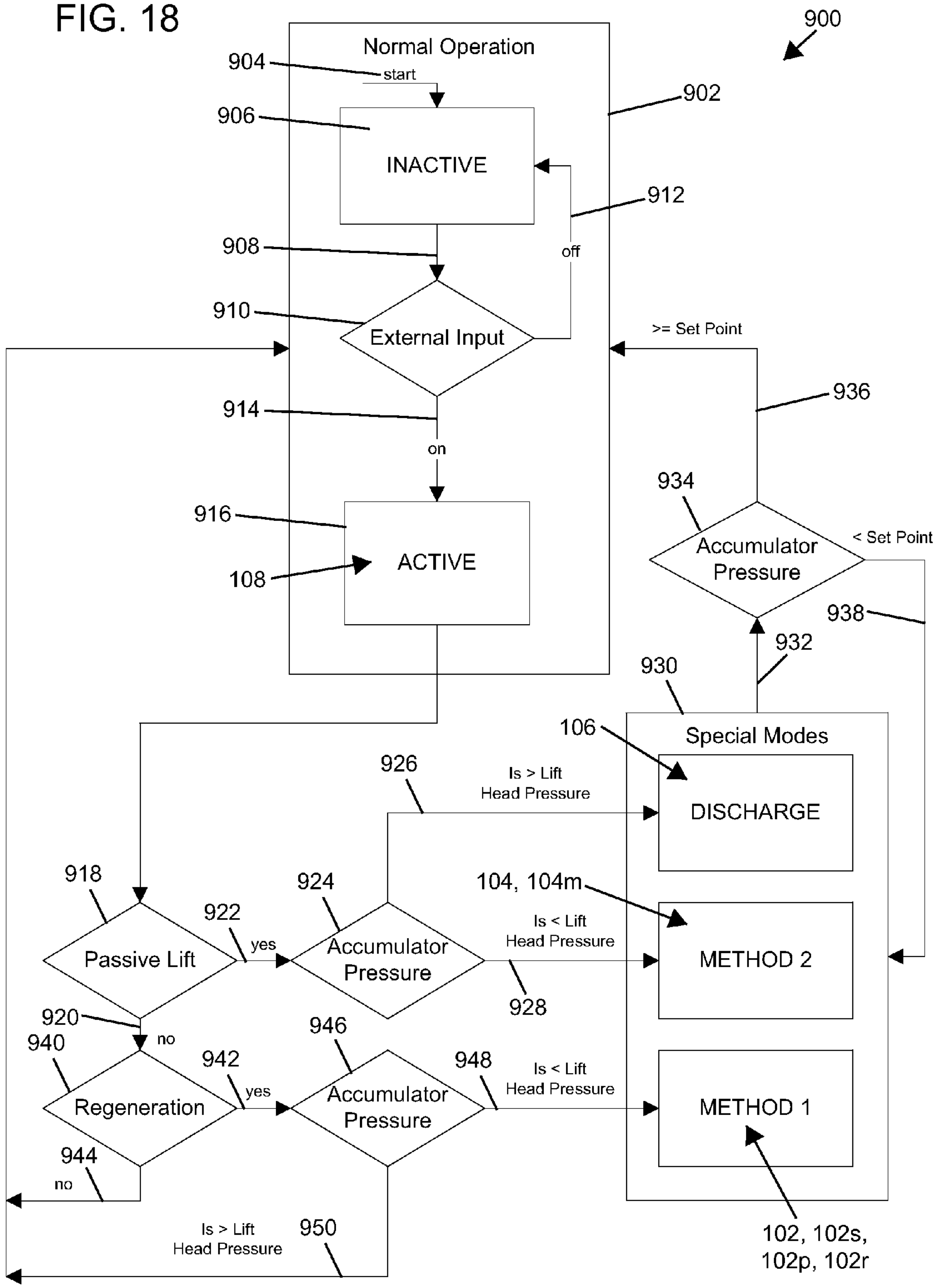
FIG. 18 is an example flow chart illustrating an operation of the control system of FIG. 2.

As illustrated at FIG. 18, the controller 270 can control the hydraulic system 100 and thereby switch between the various modes of the hydraulic system 100. A flow chart 900 includes a group of steps 902. The group of steps 902 represents a normal operation of the controller 270 in controlling the hydraulic system 100. The group of steps 902 can be initiated from the operator interface 272 by the operator. Other operations may include service operations, diagnostic operations, calibrations, etc. When the controller 270 is controlling the hydraulic system 100 under normal operation, control flow may begin at step 904, for example, upon start up of the wheel loader 800, 800'. Upon start up, the controller 270 puts the hydraulic system 100 in an inactive state 906. The controller 270 periodically checks, as represented by flow line 908, the status of an external input switch 910. The external input switch 910 can be set by the operator to either an on position or an off position. If the external input switch 910 is set to the off position, the state of the hydraulic system 100 returns to inactive as represented by flow line 912. Upon the external input switch 910 being switched to the on position, the state of the hydraulic system 100 switches to an active state 916, as represented by flow line 914. The active state 916 may include the hydraulic system 100 operating in the mode 108.

The controller 270 periodically checks for a passive lift command 918 and a regeneration command 940. If the passive lift command 918 is yes, the controller 270 reads accumulator pressure as indicated by flow line 922. If the passive lift command 918 is no, then the controller 270 checks the status of the regeneration command 940, as indicated by flow line 920. The accumulator pressure is checked at step 924. If the accumulator pressure is greater than the pressure within the head end 142, mode 106 is implemented as indicated by flow line 926. If the accumulator pressure is less than the pressure within the head end 142, then mode 104 and/or mode 104*m* is implemented as indicated by flow line 928. As indicated by box 930, mode 106, mode 104, mode 104*m*, energy capturing mode 102, and mode 102*s* are in a special modes group. Upon control flow arriving in the special modes group, the controller 270 periodically checks the accumulator pressure as indicated by flow line 932 moving control to step 934. In step 934, the controller 270 resumes the current mode in box 930 if the accumulator pressure is less than a set point, as indicated by flow line 938. At step 934, the controller 270 transfers control flow to the group of steps 902 upon the accumulator pressure being equal to or great than the set point.

Upon control flow being at the group of steps 902, the controller 270 periodically checks the passive lift command 918 and the regeneration command 940. Upon the passive lift command 918 being no, the regeneration command 940 is checked. If the regeneration command 940 is yes, then the controller 270 checks accumulator pressure as indicated by flow line 942. If the regeneration command 940 is no, the controller 270 passes control flow to the group of steps 902, as illustrated by flow line 944. Upon the accumulator pressure being checked at step 946, the controller 270 transfers control flow to the box 930 and puts the hydraulic system 100 in the energy capturing mode 102 and/or the mode 102*s*, as indicated by flow line 948. If the accumulator pressure is found to be greater than the pressure at the head end 142, the controller 270 returns control flow to the group of steps 902 as indicated by flow line 950.

The controller 270 may switch the hydraulic system 100 between modes to maximize or improve efficiency of the hydraulic system 100. In certain embodiments, mechanical and/or electrical hardware may automatically switch the hydraulic system 100 between modes to maximize or improve the efficiency of the hydraulic system 100. For example, the mode 102*p* may result in the hydraulic cylinder 130 charging the hydraulic accumulator 120 more efficiently when the hydraulic accumulator 120 is at a low charge, and the mode 102 may be required for the hydraulic cylinder 130 to charge the hydraulic accumulator 120 when the hydraulic accumulator 120 is at a high charge or a higher charge. Also, various modes of the hydraulic system 100 may result in the hydraulic cylinder 130 discharging the hydraulic accumulator 120 more efficiently when the hydraulic accumulator 120 is at the low charge, and other modes may be more efficient when the hydraulic cylinder 130 discharges the hydraulic accumulator 120 when the hydraulic accumulator 120 is at the high charge or the higher charge. The charging and the discharging of the accumulator 120 by the hydraulic cylinder 130 may be staged to increase efficiency and/or performance of the hydraulic system 100.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method of reusing energy of a work attachment of a work machine, the method comprising:

opening hydraulic fluid flow through a first flow control device, the first flow control device fluidly connected between an accumulator and a head chamber of a first hydraulic cylinder;

compressing the head chamber by moving a piston and rod of the first hydraulic cylinder with the work attachment and thereby charging the accumulator with the hydraulic fluid flow; and simultaneously actuating a second hydraulic cylinder by opening hydraulic fluid flow through a second flow control device connected between the second hydraulic cylinder and the head chamber of the first hydraulic cylinder;

wherein the first hydraulic cylinder further includes a rod chamber and a third flow control device fluidly connects the head chamber to the rod chamber and thereby amplifies a hydraulic pressure generated within the first hydraulic cylinder and used to charge the accumulator.

2. The method of claim 1, wherein the moving of the piston and rod is at least partly done by gravity acting on mass of the work attachment.

3. The method of claim 1, wherein the moving of the piston and rod is at least partly done by decelerating mass of the work attachment.

4. The method of claim 1, wherein the first hydraulic cylinder, the accumulator, and the first fluid flow control device belong to a suspension system of the work machine.

5. The method of claim 1, wherein the work machine is a wheel loader and the first hydraulic cylinder is connected to a boom of the work attachment.

6. The method of claim 5, wherein the first hydraulic cylinder, the accumulator, and the first fluid flow control device belong to a boom suspension system of the wheel loader.

7. The method of claim 5, wherein the second hydraulic cylinder is connected to the second component that is a bucket linkage of the work attachment.

8. The method of claim 1, wherein compressing the head chamber by moving the piston and the rod of the first hydraulic cylinder with the work attachment and simultaneously actuating the second hydraulic cylinder by opening the hydraulic fluid flow through the third flow control device extends the second hydraulic cylinder.

9. A hydraulic system for actuating a work attachment of a mobile work machine, the hydraulic system comprising:

a first hydraulic cylinder configured to actuate the work attachment, the first hydraulic cylinder including a piston connected to a rod, the piston positioned between a head chamber and a rod chamber of the first hydraulic cylinder, and the rod extending through the rod chamber;

an accumulator;

a first flow control device fluidly connected between the accumulator and the head chamber of the first hydraulic cylinder, the first flow control device conveying accumulator fluid flow; and a second flow control device fluidly connected between the head chamber and the rod chamber of the first hydraulic cylinder, the second flow control device conveying head to rod chamber fluid flow;

wherein the accumulator fluid flow from the head chamber of the first hydraulic cylinder charges the accumulator when the work attachment compresses the first hydraulic cylinder and the first flow control device is open;

wherein a hydraulic pressure of the accumulator fluid flow is amplified by opening the second flow control device between the head chamber and the rod chamber of the first hydraulic cylinder; and wherein net head chamber fluid flow of the head chamber equals a sum of the accumulator fluid flow and the head to rod chamber fluid flow when the hydraulic pressure of the accumulator fluid flow is amplified and charges the accumulator.

10. The hydraulic system of claim 9, wherein the mobile work machine is a wheel loader and the first hydraulic cylinder is connected to a boom of the work attachment.

11. The hydraulic system of claim 10, wherein the first hydraulic cylinder, the accumulator, and the first flow control device belong to a suspension system of the wheel loader.

12. The hydraulic system of claim 10, further comprising a bucket cylinder of the work attachment and a third flow control device connected between the bucket cylinder and the head chamber of the first hydraulic cylinder, wherein simultaneous movement of the first hydraulic cylinder and the bucket cylinder occurs from the work attachment compressing the first hydraulic cylinder.

13. The hydraulic system of claim 9, wherein a fluid displacement rate of the head chamber is between about 1.1 and 3 times larger than a fluid displacement rate of the rod chamber when the piston is moved.

14. The hydraulic system of claim 9, further comprising:

a pump;

a valve set including a plurality of valves, the valve set fluidly connected between the head chamber of the first hydraulic cylinder and the pump and also fluidly connected between the rod chamber of the first hydraulic cylinder and the pump, the valve set adapted to direct fluid flow from the pump to the head chamber to extend the first hydraulic cylinder and the valve set adapted to direct the fluid flow from the pump to the rod chamber to retract the first hydraulic cylinder; and a fluid passage fluidly connected between the head chamber of the first hydraulic cylinder and the hydraulic accumulator, the fluid passage not passing through any of the plurality of valves of the valve set, the fluid passage including the first flow control device connected to the head chamber of the first hydraulic cylinder by a first fluid line of the fluid passage and to the hydraulic accumulator by a second fluid line of the fluid passage.

15. The hydraulic system of claim 14, further comprising a tank, wherein the valve set is fluidly connected between the head chamber of the first hydraulic cylinder and the tank and also fluidly connected between the rod chamber of the first hydraulic cylinder and the tank.

16. The hydraulic system of claim 9, wherein the hydraulic system is adapted to capture energy from the work attachment and store the energy in the accumulator and wherein the hydraulic system is adapted to reuse the energy by actuating the work attachment with the rod of the first hydraulic cylinder.

17. The hydraulic system of claim 9, wherein the hydraulic system is adapted to actuate the work attachment by lifting the work attachment with the rod of the first hydraulic cylinder.

18. The hydraulic system of claim 9, wherein the second flow control device includes a first valve and a second valve that are open when the second flow control device is open.

19. A method of using a hydraulic system for actuating a work attachment of a mobile work machine, the method comprising:

providing the hydraulic system, the hydraulic system including:

a first hydraulic cylinder configured to actuate the work attachment, the first hydraulic cylinder including a piston connected to a rod, the piston positioned between a head chamber and a rod chamber of the first hydraulic cylinder, and the rod extending through the rod chamber;

an accumulator;

a first flow control device fluidly connected between the accumulator and the head chamber of the first hydraulic cylinder, the first flow control device conveying accumulator fluid flow; and a second flow control device fluidly connected between the head chamber and the rod chamber of the first hydraulic cylinder, the second flow control device conveying head to rod chamber fluid flow;

wherein net head chamber fluid flow of the head chamber equals a sum of the accumulator fluid flow and the head to rod chamber fluid flow;

charging the accumulator with the accumulator fluid flow from the head chamber of the first hydraulic cylinder when the work attachment compresses the first hydraulic cylinder and the first flow control device is open;

amplifying a hydraulic pressure of the accumulator fluid flow by opening the second flow control device between the head chamber and the rod chamber of the first hydraulic cylinder;

opening the first flow control device; and compressing the head chamber by moving the piston and rod of the first hydraulic cylinder with the work attachment and thereby charging the accumulator with the accumulator fluid flow.

20. The method of claim 19, further comprising amplifying the hydraulic pressure and charging the accumulator with the amplified hydraulic pressure by fluidly connecting the rod chamber of the first hydraulic cylinder to the head chamber with the second flow control device.

21. The method of claim 19, further comprising reusing energy captured by the charging of the accumulator by discharging the accumulator and thereby actuating the work attachment.

22. The method of claim 19, further comprising simultaneously actuating a second hydraulic cylinder by opening the accumulator fluid flow through a third flow control device connected between the second hydraulic cylinder and the head chamber of the first hydraulic cylinder.

23. The method of claim 19, wherein the moving of the piston and rod is at least partly done by gravity acting on mass of the work attachment.

24. The method of claim 19, wherein the moving of the piston and rod is at least partly done by decelerating mass of the work attachment.

25. A hydraulic suspension system for providing suspension to a work implement connected to a mobile work machine, the hydraulic suspension system comprising:

a first hydraulic cylinder including a first port fluidly connected to a head chamber of the first hydraulic cylinder, a second port fluidly connected to a rod chamber of the first hydraulic cylinder, a piston positioned between the head chamber of the first hydraulic cylinder and the rod chamber of the first hydraulic cylinder, and a rod extending between a first end of the rod and a second end of the rod and through the rod chamber, the first end of the rod connected to the piston and the second end of the rod connected to a load of the work implement;

a pump;

a valve set including a plurality of valves, the valve set fluidly connected between the first port of the first hydraulic cylinder and the pump and also fluidly connected between the second port of the first hydraulic cylinder and the pump, the valve set adapted to direct fluid flow from the pump to the first port to extend the first hydraulic cylinder and the valve set adapted to direct the fluid flow from the pump to the second port to retract the first hydraulic cylinder;

a hydraulic accumulator including an inlet/outlet port; and a fluid passage fluidly connected between the first port of the first hydraulic cylinder and the inlet/outlet port of the hydraulic accumulator, the fluid passage not passing through any of the plurality of valves of the valve set, the fluid passage including a first flow control valve fluidly connected to the first port of the first hydraulic cylinder by a first fluid line of the fluid passage and to the inlet/outlet port of the hydraulic accumulator by a second fluid line of the fluid passage;

wherein the hydraulic suspension system is adapted to capture energy from the load of the work implement and store the energy in the hydraulic accumulator;

wherein the hydraulic suspension system is adapted to reuse the energy by actuating the work implement with the rod of the first hydraulic cylinder;

wherein a fluid displacement rate of the head chamber is between about 1.1 and 3 times larger than a fluid displacement rate of the rod chamber when the piston is moved, wherein the hydraulic suspension system is adapted to fluidly connect the first and the second ports of the first hydraulic cylinder and thereby amplify a hydraulic pressure generated by the first hydraulic cylinder under the load of the work implement, and wherein the hydraulic suspension system is adapted to charge the hydraulic accumulator with the amplified hydraulic pressure; and wherein the fluid displacement rate of the head chamber equals a sum of a fluid displacement rate of the hydraulic accumulator and the fluid displacement rate of the rod chamber when the hydraulic pressure generated by the first hydraulic cylinder under the load of the work implement is amplified.

26. The hydraulic suspension system of claim 25, further comprising a tank, wherein the valve set is fluidly connected between the first port of the first hydraulic cylinder and the tank and also fluidly connected between the second port of the first hydraulic cylinder and the tank.

27. The hydraulic suspension system of claim 25, wherein the hydraulic suspension system is adapted to actuate the work implement by lifting the work implement with the rod of the first hydraulic cylinder.

28. The hydraulic suspension system of claim 25, further comprising a first flow control device of the valve set, a second flow control device, a second flow control valve of the valve set, a hydraulic junction, and a second hydraulic cylinder including a first port and a second port, wherein the first flow control device is fluidly connected between the second port of the first hydraulic cylinder and the hydraulic junction, wherein the second flow control device is fluidly connected between the first port of the second hydraulic cylinder and the hydraulic junction, wherein the second flow control valve is fluidly connected between the first port of the first hydraulic cylinder and the hydraulic junction, and wherein the hydraulic suspension system is adapted to transform the energy from the load of the work implement into actuation energy of the second hydraulic cylinder.

29. The hydraulic suspension system of claim 28, wherein the first hydraulic cylinder is a boom cylinder of the work implement and the second hydraulic cylinder is a bucket cylinder of the work implement, wherein transforming the energy from the load of the work implement into the actuation energy results in simultaneous movement of the boom cylinder and the bucket cylinder.

30. The hydraulic suspension system of claim 28, wherein the first flow control device and the second flow control device each include check valves.

31. The hydraulic suspension system of claim 25, wherein the mobile work machine is a wheel loader.

32. A method of reusing energy of a work attachment of a work machine, the method comprising:

opening accumulator fluid flow through a first flow control device, the first flow control device fluidly connected between an accumulator and a head chamber of a first hydraulic cylinder;

compressing the head chamber by moving a piston and rod of the first hydraulic cylinder with the work attachment and thereby charging the accumulator with the accumulator fluid flow;

amplifying a hydraulic pressure generated within the first hydraulic cylinder and used to charge the accumulator by fluidly connecting a rod chamber of the first hydraulic cylinder to the head chamber with a second flow control device; and transferring head to rod chamber fluid flow from the head chamber to the rod chamber of the first hydraulic cylinder;

wherein net head chamber fluid flow of the head chamber equals a sum of the accumulator fluid flow and the head to rod chamber fluid flow when the hydraulic pressure of the accumulator fluid flow is amplified and charges the accumulator.

33. The method of claim 32, wherein the moving of the piston and rod is at least partly done by gravity acting on mass of the work attachment.

34. The method of claim 32, wherein the moving of the piston and rod is at least partly done by decelerating mass of the work attachment.

35. The method of claim 32, wherein the first hydraulic cylinder, the accumulator, and the first fluid flow control device belong to a suspension system of the work machine.

36. The method of claim 32, wherein the work machine is a wheel loader and the first hydraulic cylinder is connected to a boom of the work attachment.

37. The method of claim 36, wherein the first hydraulic cylinder, the accumulator, and the first fluid flow control device belong to a boom suspension system of the wheel loader.

38. The method of claim 32, further comprising simultaneously actuating a second hydraulic cylinder by opening hydraulic fluid flow through a second flow control device connected between the second hydraulic cylinder and the head chamber of the first hydraulic cylinder.

39. The method of claim 32, wherein the second flow control device includes a first valve and a second valve and wherein fluidly connecting the rod chamber of the first hydraulic cylinder to the head chamber with the second flow control device includes opening the first valve and the second valve.

40. A method of reusing energy of a work attachment of a work machine, the method comprising:

opening hydraulic fluid flow through a first flow control device, the first flow control device fluidly connected between an accumulator and a head chamber of a first hydraulic cylinder;

compressing the head chamber by moving a piston and rod of the first hydraulic cylinder with the work attachment and thereby charging the accumulator with the hydraulic fluid flow through the first flow control device, the hydraulic fluid flow substantially equal to a head chamber hydraulic fluid flow from the head chamber of the first hydraulic cylinder;

opening head chamber to rod chamber hydraulic fluid flow through a second flow control device, the second flow control device fluidly connected between the head chamber of the first hydraulic cylinder and a rod chamber of the first hydraulic cylinder; and compressing the head chamber by moving the piston and rod of the first hydraulic cylinder with the work attachment and thereby charging the accumulator with the hydraulic fluid flow through the first flow control device, the hydraulic fluid flow substantially equal to the head chamber hydraulic fluid flow minus the head chamber to rod chamber hydraulic fluid flow through the second flow control device.

41. The method of claim 40, wherein the moving of the piston and rod is at least partly done by gravity acting on mass of the work attachment.

42. The method of claim 40, wherein the moving of the piston and rod is at least partly done by decelerating mass of the work attachment.

43. The method of claim 40, wherein the first hydraulic cylinder, the accumulator, and the first fluid flow control device belong to a suspension system of the work machine.

44. The method of claim 40, wherein the work machine is a wheel loader and the first hydraulic cylinder is connected to a boom of the work attachment.

45. The method of claim 44, wherein the first hydraulic cylinder, the accumulator, and the first fluid flow control device belong to a boom suspension system of the wheel loader.

46. The method of claim 40, further comprising simultaneously actuating a second hydraulic cylinder by actuating hydraulic fluid flow through a third flow control device connected between the second hydraulic cylinder and the head chamber of the first hydraulic cylinder.

* * * * *